US010349096B2

(12) United States Patent
Swart et al.

(10) Patent No.: US 10,349,096 B2
(45) Date of Patent: *Jul. 9, 2019

(54) VIDEO AND DIGITAL MULTIMEDIA AGGREGATOR CONTENT CODING AND FORMATTING

(71) Applicant: Comcast IP Holdings I, LLC, Wilmington, DE (US)

(72) Inventors: William D. Swart, Fairfax, VA (US); John S. McCoskey, Castle Rock, CO (US); Michael L. Asmussen, Oak Hill, VA (US)

(73) Assignee: Comcast IP Holdings I, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/065,850

(22) Filed: Oct. 29, 2013

(65) Prior Publication Data
US 2014/0059619 A1 Feb. 27, 2014

Related U.S. Application Data

(63) Continuation of application No. 12/971,033, filed on Dec. 17, 2010, now Pat. No. 8,578,410, which is a
(Continued)

(51) Int. Cl.
H04N 21/234 (2011.01)
H04N 21/236 (2011.01)
(Continued)

(52) U.S. Cl.
CPC . *H04N 21/234309* (2013.01); *H04N 7/17318* (2013.01); *H04N 21/235* (2013.01);
(Continued)

(58) Field of Classification Search
CPC ..... H04N 21/23424; H04N 21/234309; H04N 21/234345; H04N 21/23439; H04N 21/23614
(Continued)

(56) References Cited

U.S. PATENT DOCUMENTS 3,639,686 A 2/1972 Walker et al.
3,733,430 A 5/1973 Thompson et al.
(Continued)

FOREIGN PATENT DOCUMENTS

CA 2414183 A1 12/2001
DE 3423846 A1 1/1986
(Continued)

OTHER PUBLICATIONS

Canadian Office Action—CA App. 2,462,161—dated Nov. 27, 2014.
(Continued)

*Primary Examiner* — Dominic D Saltarelli
(74) *Attorney, Agent, or Firm* — Banner & Witcoff, Ltd.

(57) ABSTRACT

A video and digital multimedia aggregator includes a content decoder, coder (codec) and formatter. The codec formatter receives coding and formatting requests that characterize input source content and desired output target content. Data conveyed about the source and target content may include parameters such as physical and/or logical addresses, coding and compression parameters, format descriptions, content size, description of auxiliary services, and other metadata elements that may be required for coding and formatting.

20 Claims, 10 Drawing Sheets

Related U.S. Application Data continuation of application No. 09/973,067, filed on Oct. 10, 2001, now Pat. No. 7,908,628, which is a continuation-in-part of application No. 09/920,723, filed on Aug. 3, 2001, now Pat. No. 7,793,326, and a continuation-in-part of application No. 09/920,615, filed on Aug. 3, 2001, now Pat. No. 8,285,701.

(51) Int. Cl.

| | |
|---|---|
| *H04N 21/2343* | (2011.01) |
| *H04N 7/173* | (2011.01) |
| *H04N 21/235* | (2011.01) |
| *H04N 21/2543* | (2011.01) |
| *H04N 21/258* | (2011.01) |
| *H04N 21/2662* | (2011.01) |
| *H04N 21/433* | (2011.01) |
| *H04N 21/435* | (2011.01) |
| *H04N 21/442* | (2011.01) |
| *H04N 21/482* | (2011.01) |
| *H04N 21/6377* | (2011.01) |
| *H04N 21/658* | (2011.01) |
| *H04N 21/81* | (2011.01) |

(52) U.S. Cl.
 CPC ..... *H04N 21/2343* (2013.01); *H04N 21/2543* (2013.01); *H04N 21/25808* (2013.01); *H04N 21/2662* (2013.01); *H04N 21/435* (2013.01); *H04N 21/4334* (2013.01); *H04N 21/44204* (2013.01); *H04N 21/4828* (2013.01); *H04N 21/6377* (2013.01); *H04N 21/658* (2013.01); *H04N 21/6582* (2013.01); *H04N 21/81* (2013.01)

(58) Field of Classification Search
 USPC .......................................... 725/93, 116, 136
 See application file for complete search history.

(56) References Cited

U.S. PATENT DOCUMENTS

| | | |
|---|---|---|
| 3,754,211 A | 8/1973 | Rocher et al. |
| 3,993,955 A | 11/1976 | Belcher et al. |
| 4,197,590 A | 4/1980 | Sukonick et al. |
| 4,213,124 A | 7/1980 | Barda et al. |
| 4,225,884 A | 9/1980 | Block et al. |
| 4,250,356 A | 2/1981 | Hammer, Jr. et al. |
| 4,250,521 A | 2/1981 | Wright |
| 4,264,924 A | 4/1981 | Freeman |
| 4,264,964 A | 4/1981 | Berger |
| 4,279,035 A | 7/1981 | Skerlos |
| 4,290,063 A | 9/1981 | Traster |
| 4,318,522 A | 3/1982 | Appleberry |
| 4,331,794 A | 5/1982 | D'Alelio et al. |
| 4,331,974 A | 5/1982 | Cogswell et al. |
| 4,334,245 A | 6/1982 | Michael |
| 4,361,848 A | 11/1982 | Poignet et al. |
| 4,381,522 A | 4/1983 | Lambert |
| 4,398,216 A | 8/1983 | Field et al. |
| 4,402,279 A | 9/1983 | Witte et al. |
| 4,437,093 A | 3/1984 | Bradley |
| 4,450,481 A | 5/1984 | Dickinson |
| 4,451,701 A | 5/1984 | Bendig |
| 4,455,548 A | 6/1984 | Burnett |
| 4,455,570 A | 6/1984 | Saeki et al. |
| 4,456,925 A | 6/1984 | Skerlos et al. |
| 4,479,142 A | 10/1984 | Buschman et al. |
| 4,484,217 A | 11/1984 | Block et al. |
| 4,484,218 A | 11/1984 | Boland et al. |
| 4,488,179 A | 12/1984 | Kru/ ger et al. |
| 4,496,976 A | 1/1985 | Swanson et al. |
| 4,507,680 A | 3/1985 | Freeman |
| 4,509,198 A | 4/1985 | Nagatomi |
| 4,513,315 A | 4/1985 | Dekker et al. |
| 4,517,598 A | 5/1985 | Van Valkenburg et al. |
| 4,520,356 A | 5/1985 | O'Keefe et al. |
| 4,520,921 A | 6/1985 | Vissing |
| 4,528,589 A | 7/1985 | Block et al. |
| 4,528,643 A | 7/1985 | Freeny, Jr. |
| D280,099 S | 8/1985 | Topp |
| 4,533,948 A | 8/1985 | McNamara et al. |
| 4,546,382 A | 10/1985 | McKenna et al. |
| 4,558,464 A | 12/1985 | O'Brien, Jr. |
| 4,567,512 A | 1/1986 | Abraham |
| 4,573,072 A | 2/1986 | Freeman |
| 4,581,484 A | 4/1986 | Bendig |
| 4,587,520 A | 5/1986 | Astle |
| RE32,187 E | 6/1986 | Barda et al. |
| 4,600,921 A | 7/1986 | Thomas |
| 4,602,278 A | 7/1986 | Pritchard et al. |
| 4,602,279 A | 7/1986 | Freeman |
| 4,605,964 A | 8/1986 | Chard |
| 4,620,289 A | 10/1986 | Chauvel |
| 4,621,282 A | 11/1986 | Ahern |
| 4,633,297 A | 12/1986 | Skerlos et al. |
| 4,633,462 A | 12/1986 | Stifle et al. |
| 4,639,225 A | 1/1987 | Washizuka |
| 4,641,205 A | 2/1987 | Beyers, Jr. |
| 4,646,150 A | 2/1987 | Robbins et al. |
| 4,647,964 A | 3/1987 | Weinblatt |
| 4,658,290 A | 4/1987 | McKenna et al. |
| 4,665,559 A | 5/1987 | Benun |
| 4,673,976 A | 6/1987 | Wreford-Howard |
| 4,674,085 A | 6/1987 | Aranguren et al. |
| 4,677,685 A | 6/1987 | Kurisu |
| 4,688,218 A | 8/1987 | Blineau et al. |
| 4,688,246 A | 8/1987 | Eilers et al. |
| 4,691,340 A | 9/1987 | Maeda et al. |
| 4,694,490 A | 9/1987 | Harvey et al. |
| 4,695,880 A | 9/1987 | Johnson et al. |
| 4,695,975 A | 9/1987 | Bedrij |
| 4,697,209 A | 9/1987 | Kiewit et al. |
| 4,706,121 A | 11/1987 | Young |
| 4,712,105 A | 12/1987 | Kohler |
| 4,712,130 A | 12/1987 | Casey |
| 4,712,239 A | 12/1987 | Frezza et al. |
| 4,724,491 A | 2/1988 | Lambert |
| 4,725,694 A | 2/1988 | Auer et al. |
| 4,734,764 A | 3/1988 | Pocock et al. |
| 4,739,318 A | 4/1988 | Cohen |
| 4,739,510 A | 4/1988 | Jeffers et al. |
| 4,740,834 A | 4/1988 | Mobarry |
| 4,742,344 A | 5/1988 | Nakagawa et al. |
| 4,745,468 A | 5/1988 | Von Kohorn |
| 4,745,479 A | 5/1988 | Waehner |
| 4,747,785 A | 5/1988 | Roberts et al. |
| 4,751,578 A | 6/1988 | Reiter et al. |
| 4,775,935 A | 10/1988 | Yourick |
| 4,779,138 A | 10/1988 | Nomura et al. |
| RE32,776 E | 11/1988 | Saylor |
| 4,792,848 A | 12/1988 | Nussrallah et al. |
| 4,792,849 A | 12/1988 | McCalley et al. |
| 4,792,972 A | 12/1988 | Cook, Jr. |
| 4,797,568 A | 1/1989 | Gumbs |
| 4,797,918 A | 1/1989 | Lee et al. |
| 4,802,008 A | 1/1989 | Walling |
| 4,805,014 A | 2/1989 | Sahara et al. |
| 4,816,901 A | 3/1989 | Music et al. |
| 4,816,904 A | 3/1989 | McKenna et al. |
| 4,825,200 A | 4/1989 | Evans et al. |
| 4,825,220 A | 4/1989 | Edward et al. |
| D301,037 S | 5/1989 | Matsuda |
| 4,829,372 A | 5/1989 | McCalley et al. |
| 4,829,558 A | 5/1989 | Welsh |
| 4,829,569 A | 5/1989 | Seth-Smith et al. |
| 4,835,607 A | 5/1989 | Keith |
| 4,845,662 A | 7/1989 | Tokumitsu |
| 4,847,825 A | 7/1989 | Levine |
| 4,860,123 A | 8/1989 | McCalley et al. |
| 4,860,379 A | 8/1989 | Schoeneberger et al. |
| 4,866,770 A | 9/1989 | Seth-Smith et al. |
| 4,876,592 A | 10/1989 | Von Kohorn |

(56) References Cited

U.S. PATENT DOCUMENTS

| | | |
|---|---|---|
| 4,876,736 A | 10/1989 | Kiewit |
| 4,878,048 A | 10/1989 | Gottesman et al. |
| 4,884,267 A | 11/1989 | Miyamoto et al. |
| 4,885,775 A | 12/1989 | Lucas |
| 4,885,803 A | 12/1989 | Hermann et al. |
| 4,887,308 A | 12/1989 | Dutton |
| 4,888,638 A | 12/1989 | Bohn |
| 4,890,321 A | 12/1989 | Seth-Smith et al. |
| 4,896,354 A | 1/1990 | Inagaki et al. |
| 4,896,370 A | 1/1990 | Kasparian et al. |
| 4,905,094 A | 2/1990 | Pocock et al. |
| 4,907,082 A | 3/1990 | Richards |
| 4,908,713 A | 3/1990 | Levine |
| 4,916,441 A | 4/1990 | Gombrich |
| 4,918,516 A | 4/1990 | Freeman |
| 4,920,432 A | 4/1990 | Eggers et al. |
| 4,922,529 A | 5/1990 | Kiel |
| 4,924,303 A | 5/1990 | Brandon et al. |
| 4,926,255 A | 5/1990 | Von Kohorn |
| 4,928,168 A | 5/1990 | Iwashita |
| 4,930,160 A | 5/1990 | Vogel |
| 4,931,872 A | 6/1990 | Stoddard et al. |
| 4,935,924 A | 6/1990 | Baxter |
| 4,941,040 A | 7/1990 | Pocock et al. |
| 4,943,963 A | 7/1990 | Waechter et al. |
| 4,947,429 A | 8/1990 | Bestler et al. |
| 4,949,187 A | 8/1990 | Cohen |
| 4,956,725 A | 9/1990 | Kozuki et al. |
| 4,959,810 A | 9/1990 | Darbee et al. |
| 4,961,109 A | 10/1990 | Tanaka |
| 4,963,994 A | 10/1990 | Levine |
| 4,965,825 A | 10/1990 | Harvey et al. |
| 4,974,252 A | 11/1990 | Osborne |
| 4,975,771 A | 12/1990 | Kassatly |
| 4,975,951 A | 12/1990 | Bennett |
| 4,977,455 A | 12/1990 | Young |
| 4,985,697 A | 1/1991 | Boulton |
| 4,985,761 A | 1/1991 | Adams |
| 4,991,011 A | 2/1991 | Johnson et al. |
| 4,994,908 A | 2/1991 | Kuban et al. |
| 4,994,909 A | 2/1991 | Graves et al. |
| 4,995,074 A | 2/1991 | Goldman et al. |
| 4,995,078 A | 2/1991 | Monslow et al. |
| 4,996,597 A | 2/1991 | Duffield |
| 5,001,554 A | 3/1991 | Johnson et al. |
| 5,003,384 A | 3/1991 | Durden et al. |
| 5,003,591 A | 3/1991 | Kauffman et al. |
| 5,014,125 A | 5/1991 | Pocock et al. |
| 5,014,267 A | 5/1991 | Tompkins et al. |
| 5,015,829 A | 5/1991 | Eilert et al. |
| 5,020,129 A | 5/1991 | Martin et al. |
| 5,027,400 A | 6/1991 | Baji et al. |
| 5,029,014 A | 7/1991 | Lindstrom |
| 5,029,232 A | 7/1991 | Nall |
| 5,034,807 A | 7/1991 | Von Kohorn |
| 5,036,394 A | 7/1991 | Morii et al. |
| 5,036,537 A | 7/1991 | Jeffers et al. |
| 5,038,211 A | 8/1991 | Hallenbeck |
| 5,038,402 A | 8/1991 | Robbins |
| 5,040,067 A | 8/1991 | Yamazaki |
| 5,046,093 A | 9/1991 | Wachob |
| 5,047,858 A | 9/1991 | Aimonoya |
| 5,047,867 A | 9/1991 | Strubbe et al. |
| 5,047,887 A | 9/1991 | Boshek |
| 5,049,990 A | 9/1991 | Kondo et al. |
| 5,054,071 A | 10/1991 | Bacon |
| 5,055,924 A | 10/1991 | Skutta |
| 5,056,138 A | 10/1991 | Tyson, Sr. |
| 5,057,915 A | 10/1991 | Von Kohorn |
| 5,057,917 A | 10/1991 | Shalkauser et al. |
| 5,058,160 A | 10/1991 | Banker et al. |
| 5,066,319 A | 11/1991 | Lippold |
| 5,070,400 A | 12/1991 | Lieberman |
| 5,073,930 A | 12/1991 | Green et al. |
| 5,075,771 A | 12/1991 | Hashimoto |
| 5,077,607 A | 12/1991 | Johnson et al. |
| 5,078,019 A | 1/1992 | Aoki |
| 5,083,205 A | 1/1992 | Arai |
| 5,091,782 A | 2/1992 | Krause et al. |
| 5,093,718 A | 3/1992 | Hoarty et al. |
| 5,099,319 A | 3/1992 | Esch et al. |
| D325,581 S | 4/1992 | Schwartz |
| 5,103,314 A | 4/1992 | Keenan |
| 5,105,268 A | 4/1992 | Yamanouchi et al. |
| 5,109,279 A | 4/1992 | Ando |
| 5,113,496 A | 5/1992 | McCalley et al. |
| 5,115,309 A | 5/1992 | Hang |
| 5,115,426 A | 5/1992 | Spanke |
| 5,119,188 A | 6/1992 | McCalley et al. |
| 5,121,205 A | 6/1992 | Ng et al. |
| 5,123,046 A | 6/1992 | Levine |
| 5,124,980 A | 6/1992 | Maki |
| 5,128,752 A | 7/1992 | Von Kohorn |
| 5,130,792 A | 7/1992 | Tindell et al. |
| 5,130,794 A | 7/1992 | Ritchey |
| 5,132,789 A | 7/1992 | Ammon et al. |
| 5,132,992 A | 7/1992 | Yurt et al. |
| 5,133,079 A | 7/1992 | Ballantyne et al. |
| 5,134,712 A | 7/1992 | Yamamoto |
| 5,142,690 A | 8/1992 | McMullan, Jr. et al. |
| D329,238 S | 9/1992 | Grasso et al. |
| 5,144,445 A | 9/1992 | Higashitsutsumi |
| 5,144,663 A | 9/1992 | Kudelski et al. |
| 5,146,210 A | 9/1992 | Heberle |
| 5,150,118 A | 9/1992 | Finkle et al. |
| 5,151,782 A | 9/1992 | Ferraro |
| 5,151,785 A | 9/1992 | Citta |
| 5,151,789 A | 9/1992 | Young |
| 5,152,011 A | 9/1992 | Schwob |
| 5,153,763 A | 10/1992 | Pidgeon |
| 5,155,591 A | 10/1992 | Wachob |
| 5,157,717 A | 10/1992 | Hitchcock |
| 5,161,012 A | 11/1992 | Choi |
| 5,161,019 A | 11/1992 | Emanuel |
| 5,166,886 A | 11/1992 | Molnar et al. |
| D331,760 S | 12/1992 | Renk, Jr. |
| 5,168,372 A | 12/1992 | Sweetser |
| 5,172,413 A | 12/1992 | Bradley et al. |
| 5,172,423 A | 12/1992 | France |
| 5,182,639 A | 1/1993 | Jutamulia et al. |
| 5,182,640 A | 1/1993 | Takano |
| 5,187,710 A | 2/1993 | Chau et al. |
| 5,187,735 A | 2/1993 | Herrero Garcia et al. |
| 5,191,410 A | 3/1993 | McCalley et al. |
| 5,192,999 A | 3/1993 | Graczyk et al. |
| 5,195,022 A | 3/1993 | Hoppal et al. |
| 5,195,092 A | 3/1993 | Wilson et al. |
| 5,202,817 A | 4/1993 | Koenck et al. |
| 5,206,722 A | 4/1993 | Kwan |
| 5,206,929 A | 4/1993 | Langford et al. |
| 5,206,954 A | 4/1993 | Inoue et al. |
| 5,208,660 A | 5/1993 | Yoshida |
| 5,208,665 A | 5/1993 | McCalley et al. |
| 5,212,553 A | 5/1993 | Maruoka |
| 5,216,515 A | 6/1993 | Steele et al. |
| 5,221,962 A | 6/1993 | Backus et al. |
| 5,223,924 A | 6/1993 | Strubbe |
| 5,227,874 A | 7/1993 | Von Kohorn |
| 5,229,852 A | 7/1993 | Maietta et al. |
| 5,231,494 A | 7/1993 | Wachob |
| 5,231,516 A | 7/1993 | Kamon et al. |
| 5,231,665 A | 7/1993 | Auld et al. |
| 5,233,654 A | 8/1993 | Harvey et al. |
| 5,235,328 A | 8/1993 | Kurita |
| 5,235,419 A | 8/1993 | Krause |
| 5,236,199 A | 8/1993 | Thompson, Jr. |
| 5,237,311 A | 8/1993 | Mailey et al. |
| 5,237,610 A | 8/1993 | Gammie et al. |
| 5,239,540 A | 8/1993 | Rovira et al. |
| 5,241,428 A | 8/1993 | Goldwasser et al. |
| 5,241,659 A | 8/1993 | Parulski et al. |
| 5,247,347 A | 9/1993 | Litteral et al. |
| 5,247,364 A | 9/1993 | Banker et al. |
| 5,247,575 A | 9/1993 | Sprague et al. |

(56) References Cited

U.S. PATENT DOCUMENTS

| | | |
|---|---|---|
| 5,249,044 A | 9/1993 | Von Kohorn |
| 5,251,324 A | 10/1993 | McMullan, Jr. |
| 5,253,066 A | 10/1993 | Vogel |
| 5,253,275 A | 10/1993 | Yurt et al. |
| 5,253,341 A | 10/1993 | Rozmanith et al. |
| 5,255,086 A | 10/1993 | McMullan, Jr. et al. |
| D341,383 S | 11/1993 | London et al. |
| 5,260,778 A | 11/1993 | Kauffman et al. |
| 5,260,788 A | 11/1993 | Takano et al. |
| 5,264,933 A | 11/1993 | Rosser et al. |
| 5,270,809 A | 12/1993 | Gammie et al. |
| 5,274,700 A | 12/1993 | Gechter et al. |
| 5,276,731 A | 1/1994 | Arbel et al. |
| 5,282,028 A | 1/1994 | Johnson et al. |
| 5,283,561 A | 2/1994 | Lumelsky et al. |
| 5,283,639 A | 2/1994 | Esch et al. |
| 5,283,734 A | 2/1994 | Von Kohorn |
| 5,285,272 A | 2/1994 | Bradley et al. |
| 5,289,271 A | 2/1994 | Watson |
| 5,289,288 A | 2/1994 | Silverman et al. |
| 5,293,357 A | 3/1994 | Hallenbeck |
| 5,293,540 A | 3/1994 | Trani et al. |
| 5,293,633 A | 3/1994 | Robbins |
| 5,297,204 A | 3/1994 | Levine |
| 5,301,028 A | 4/1994 | Banker et al. |
| 5,301,050 A | 4/1994 | Czerwiec et al. |
| 5,303,295 A | 4/1994 | West et al. |
| 5,303,361 A | 4/1994 | Colwell et al. |
| 5,307,173 A | 4/1994 | Yuen et al. |
| 5,307,481 A | 4/1994 | Shimazaki et al. |
| 5,311,423 A | 5/1994 | Clark |
| 5,311,425 A | 5/1994 | Inada |
| 5,315,584 A | 5/1994 | Savary et al. |
| 5,317,391 A | 5/1994 | Banker et al. |
| 5,319,454 A | 6/1994 | Schutte |
| 5,319,455 A | 6/1994 | Hoarty et al. |
| 5,319,707 A | 6/1994 | Wasilewski et al. |
| 5,323,240 A | 6/1994 | Amano et al. |
| 5,327,554 A | 7/1994 | Palazzi, III et al. |
| 5,329,590 A | 7/1994 | Pond |
| 5,335,079 A | 8/1994 | Yuen et al. |
| 5,335,276 A | 8/1994 | Thompson et al. |
| 5,335,313 A | 8/1994 | Douglas |
| 5,339,239 A | 8/1994 | Manabe et al. |
| 5,339,315 A | 8/1994 | Maeda et al. |
| 5,341,166 A | 8/1994 | Garr et al. |
| 5,341,425 A | 8/1994 | Wasilewski et al. |
| 5,341,426 A | 8/1994 | Barney et al. |
| 5,341,474 A | 8/1994 | Gelman et al. |
| 5,343,239 A | 8/1994 | Lappington et al. |
| 5,343,516 A | 8/1994 | Callele et al. |
| 5,345,594 A | 9/1994 | Tsuda |
| 5,347,304 A | 9/1994 | Moura et al. |
| 5,349,638 A | 9/1994 | Pitroda et al. |
| 5,351,075 A | 9/1994 | Herz et al. |
| 5,353,121 A | 10/1994 | Young et al. |
| 5,355,162 A | 10/1994 | Yazolino et al. |
| 5,357,276 A | 10/1994 | Banker et al. |
| 5,359,601 A | 10/1994 | Wasilewski et al. |
| 5,361,091 A | 11/1994 | Hoarty et al. |
| 5,363,431 A | 11/1994 | Schull et al. |
| 5,365,265 A | 11/1994 | Shibata et al. |
| 5,365,282 A | 11/1994 | Levine |
| 5,367,330 A | 11/1994 | Haave et al. |
| 5,367,571 A | 11/1994 | Bowen et al. |
| 5,373,330 A | 12/1994 | Levine |
| 5,374,951 A | 12/1994 | Welsh |
| 5,375,068 A | 12/1994 | Palmer et al. |
| 5,375,161 A | 12/1994 | Fuller et al. |
| 5,376,969 A | 12/1994 | Zdepski |
| 5,381,477 A | 1/1995 | Beyers, II et al. |
| 5,382,983 A | 1/1995 | Kwoh et al. |
| 5,384,588 A | 1/1995 | Martin et al. |
| 5,386,241 A | 1/1995 | Park |
| 5,387,941 A | 2/1995 | Montgomery et al. |
| 5,389,964 A | 2/1995 | Oberle et al. |
| 5,390,348 A | 2/1995 | Magin et al. |
| 5,393,964 A | 2/1995 | Hamilton et al. |
| 5,396,546 A | 3/1995 | Remillard |
| 5,398,074 A | 3/1995 | Duffield et al. |
| 5,400,401 A | 3/1995 | Wasilewski et al. |
| 5,400,402 A | 3/1995 | Garfinkle |
| 5,404,393 A | 4/1995 | Remillard |
| 5,404,505 A | 4/1995 | Levinson |
| 5,406,557 A | 4/1995 | Baudoin |
| 5,406,558 A | 4/1995 | Rovira et al. |
| 5,406,564 A | 4/1995 | Okita |
| 5,406,615 A | 4/1995 | Miller, II et al. |
| 5,408,258 A | 4/1995 | Kolessar |
| 5,410,326 A | 4/1995 | Goldstein |
| 5,410,344 A | 4/1995 | Graves et al. |
| 5,410,367 A | 4/1995 | Zahavi et al. |
| 5,412,416 A | 5/1995 | Nemirofsky |
| 5,412,720 A | 5/1995 | Hoarty |
| 5,414,426 A | 5/1995 | O'Donnell et al. |
| 5,414,448 A | 5/1995 | Wada et al. |
| 5,414,756 A | 5/1995 | Levine |
| 5,416,508 A | 5/1995 | Sakuma et al. |
| 5,420,647 A | 5/1995 | Levine |
| 5,420,866 A | 5/1995 | Wasilewski |
| 5,421,031 A | 5/1995 | De Bey |
| 5,422,674 A | 6/1995 | Hooper et al. |
| 5,424,770 A | 6/1995 | Schmelzer et al. |
| 5,426,699 A | 6/1995 | Wunderlich et al. |
| 5,428,404 A | 6/1995 | Ingram et al. |
| 5,428,608 A | 6/1995 | Freeman et al. |
| 5,432,542 A | 7/1995 | Thibadeau et al. |
| 5,432,561 A | 7/1995 | Strubbe |
| 5,438,370 A | 8/1995 | Primiano et al. |
| 5,438,372 A | 8/1995 | Tsumori et al. |
| 5,440,632 A | 8/1995 | Bacon et al. |
| 5,442,389 A | 8/1995 | Blahut et al. |
| 5,442,452 A | 8/1995 | Ryu |
| 5,442,626 A | 8/1995 | Wei |
| 5,446,490 A | 8/1995 | Blahut et al. |
| 5,446,919 A | 8/1995 | Wilkins |
| 5,448,313 A | 9/1995 | Kim et al. |
| 5,448,568 A | 9/1995 | Delpuch et al. |
| 5,449,970 A | 9/1995 | Kumar et al. |
| 5,461,667 A | 10/1995 | Remillard |
| 5,467,144 A | 11/1995 | Saeger et al. |
| 5,467,402 A | 11/1995 | Okuyama et al. |
| 5,469,206 A | 11/1995 | Strubbe et al. |
| 5,473,362 A | 12/1995 | Fitzgerald et al. |
| 5,473,609 A | 12/1995 | Chaney |
| 5,473,704 A | 12/1995 | Abe |
| 5,475,382 A | 12/1995 | Yuen et al. |
| 5,477,262 A | 12/1995 | Banker et al. |
| 5,477,263 A | 12/1995 | O'Callaghan et al. |
| 5,479,266 A | 12/1995 | Young et al. |
| 5,479,268 A | 12/1995 | Young et al. |
| 5,479,411 A | 12/1995 | Klein |
| 5,479,508 A | 12/1995 | Bestler et al. |
| 5,481,294 A | 1/1996 | Thomas et al. |
| 5,481,296 A | 1/1996 | Cragun et al. |
| 5,481,542 A | 1/1996 | Logston et al. |
| 5,483,277 A | 1/1996 | Granger |
| 5,483,278 A | 1/1996 | Strubbe et al. |
| 5,483,287 A | 1/1996 | Siracusa |
| 5,483,588 A | 1/1996 | Eaton et al. |
| 5,485,197 A | 1/1996 | Hoarty |
| 5,485,221 A * | 1/1996 | Banker .............. H04N 5/272 348/563 |
| 5,488,409 A | 1/1996 | Yuen et al. |
| 5,488,412 A | 1/1996 | Majeti et al. |
| 5,490,247 A | 2/1996 | Tung et al. |
| 5,493,339 A | 2/1996 | Birch et al. |
| 5,493,568 A | 2/1996 | Sampat et al. |
| 5,493,638 A | 2/1996 | Hooper et al. |
| 5,493,677 A | 2/1996 | Balogh et al. |
| 5,497,187 A | 3/1996 | Banker et al. |
| 5,500,794 A | 3/1996 | Fujita et al. |
| 5,500,933 A | 3/1996 | Schnorf |
| 5,502,504 A | 3/1996 | Marshall et al. |

(56) References Cited

U.S. PATENT DOCUMENTS

| | | |
|---|---|---|
| 5,508,733 A | 4/1996 | Kassatly |
| 5,508,815 A | 4/1996 | Levine |
| 5,512,934 A | 4/1996 | Kochanski |
| 5,512,935 A | 4/1996 | Majeti et al. |
| 5,515,098 A | 5/1996 | Carles |
| 5,515,106 A | 5/1996 | Chaney et al. |
| 5,515,173 A | 5/1996 | Mankovitz et al. |
| 5,517,257 A | 5/1996 | Dunn et al. |
| 5,517,502 A | 5/1996 | Bestler et al. |
| 5,523,794 A | 6/1996 | Mankovitz et al. |
| 5,523,796 A | 6/1996 | Marshall et al. |
| 5,526,034 A | 6/1996 | Hoarty et al. |
| 5,528,281 A | 6/1996 | Grady et al. |
| 5,530,754 A | 6/1996 | Garfinkle |
| 5,532,732 A | 7/1996 | Yuen et al. |
| 5,532,754 A | 7/1996 | Young et al. |
| 5,533,110 A | 7/1996 | Pinard et al. |
| 5,534,913 A | 7/1996 | Majeti et al. |
| 5,534,944 A | 7/1996 | Egawa et al. |
| 5,537,141 A | 7/1996 | Harper et al. |
| 5,537,153 A | 7/1996 | Shigihara |
| 5,537,157 A | 7/1996 | Washino et al. |
| 5,539,391 A | 7/1996 | Yuen |
| 5,539,449 A | 7/1996 | Blahut et al. |
| 5,539,822 A | 7/1996 | Lett |
| 5,539,871 A | 7/1996 | Gibson |
| 5,543,852 A | 8/1996 | Yuen et al. |
| 5,543,853 A | 8/1996 | Haskell et al. |
| 5,544,161 A | 8/1996 | Bigham et al. |
| 5,546,316 A | 8/1996 | Buckley et al. |
| 5,546,447 A | 8/1996 | Skarbo et al. |
| 5,550,576 A | 8/1996 | Klosterman |
| 5,550,863 A | 8/1996 | Yurt et al. |
| 5,552,837 A | 9/1996 | Mankovitz |
| 5,553,123 A | 9/1996 | Chan et al. |
| 5,557,316 A | 9/1996 | Hoarty et al. |
| 5,559,548 A | 9/1996 | Davis et al. |
| 5,559,549 A | 9/1996 | Hendricks et al. |
| 5,559,550 A | 9/1996 | Mankovitz |
| 5,559,800 A | 9/1996 | Mousseau et al. |
| 5,559,870 A | 9/1996 | Patton et al. |
| 5,561,604 A | 10/1996 | Buckley et al. |
| 5,561,708 A | 10/1996 | Remillard |
| 5,561,709 A | 10/1996 | Remillard |
| 5,568,272 A | 10/1996 | Levine |
| 5,570,126 A | 10/1996 | Blahut et al. |
| 5,572,005 A | 11/1996 | Hamilton et al. |
| 5,579,055 A | 11/1996 | Hamilton et al. |
| 5,579,057 A | 11/1996 | Banker et al. |
| 5,579,522 A | 11/1996 | Christeson et al. |
| 5,581,614 A | 12/1996 | Ng et al. |
| 5,583,560 A | 12/1996 | Florin et al. |
| 5,583,576 A | 12/1996 | Perlman et al. |
| 5,583,965 A | 12/1996 | Douma et al. |
| 5,584,054 A | 12/1996 | Tyneski et al. |
| 5,585,838 A | 12/1996 | Lawler et al. |
| 5,585,865 A | 12/1996 | Amano et al. |
| 5,585,866 A | 12/1996 | Miller et al. |
| 5,587,735 A | 12/1996 | Ishida et al. |
| 5,588,104 A | 12/1996 | Lanier et al. |
| 5,588,139 A | 12/1996 | Lanier et al. |
| 5,589,892 A | 12/1996 | Knee et al. |
| 5,592,529 A | 1/1997 | Linsker |
| 5,592,551 A | 1/1997 | Lett et al. |
| 5,594,509 A | 1/1997 | Florin et al. |
| 5,596,373 A | 1/1997 | White et al. |
| 5,598,415 A | 1/1997 | Nuber et al. |
| 5,598,525 A | 1/1997 | Nally et al. |
| 5,600,364 A | 2/1997 | Hendricks et al. |
| 5,600,368 A | 2/1997 | Matthews, III |
| 5,600,378 A | 2/1997 | Wasilewski |
| 5,600,573 A | 2/1997 | Hendricks et al. |
| 5,600,711 A | 2/1997 | Yuen |
| 5,600,775 A | 2/1997 | King et al. |
| 5,604,528 A | 2/1997 | Edwards et al. |
| 5,608,447 A | 3/1997 | Farry et al. |
| 5,610,910 A | 3/1997 | Focsaneanu et al. |
| 5,612,997 A | 3/1997 | Vallelonga, Sr. et al. |
| 5,615,252 A | 3/1997 | Sizer, II et al. |
| 5,619,247 A | 4/1997 | Russo |
| 5,619,249 A | 4/1997 | Billock et al. |
| 5,619,269 A | 4/1997 | Lee et al. |
| 5,619,274 A | 4/1997 | Roop et al. |
| 5,619,337 A | 4/1997 | Naimpally |
| 5,619,383 A | 4/1997 | Ngai |
| 5,619,684 A | 4/1997 | Goodwin et al. |
| 5,621,456 A | 4/1997 | Florin et al. |
| 5,621,579 A | 4/1997 | Yuen |
| 5,621,793 A | 4/1997 | Bednarek et al. |
| 5,623,308 A | 4/1997 | Civanlar et al. |
| 5,625,405 A | 4/1997 | DuLac et al. |
| 5,625,406 A | 4/1997 | Newberry et al. |
| 5,628,005 A | 5/1997 | Hurvig |
| 5,629,733 A | 5/1997 | Youman et al. |
| 5,629,978 A | 5/1997 | Blumhardt et al. |
| 5,630,103 A | 5/1997 | Smith et al. |
| 5,630,119 A | 5/1997 | Aristides et al. |
| 5,633,683 A | 5/1997 | Rosengren et al. |
| 5,633,810 A | 5/1997 | Mandal et al. |
| 5,635,978 A | 6/1997 | Alten et al. |
| 5,635,989 A | 6/1997 | Rothmuller |
| 5,636,346 A | 6/1997 | Saxe |
| 5,638,505 A | 6/1997 | Hemenway et al. |
| 5,639,350 A | 6/1997 | Aula et al. |
| 5,640,196 A | 6/1997 | Behrens et al. |
| 5,642,348 A | 6/1997 | Barzegar et al. |
| 5,644,354 A | 7/1997 | Thompson et al. |
| 5,644,628 A | 7/1997 | Schwarzer et al. |
| 5,652,614 A | 7/1997 | Okabayashi |
| 5,652,615 A | 7/1997 | Bryant et al. |
| 5,652,789 A | 7/1997 | Miner et al. |
| 5,657,072 A | 8/1997 | Aristides et al. |
| 5,659,350 A | 8/1997 | Hendricks et al. |
| 5,659,367 A | 8/1997 | Yuen |
| 5,661,516 A | 8/1997 | Carles |
| 5,663,757 A | 9/1997 | Morales |
| 5,666,487 A | 9/1997 | Goodman et al. |
| 5,666,645 A | 9/1997 | Thomas et al. |
| 5,668,599 A | 9/1997 | Cheney et al. |
| 5,671,267 A | 9/1997 | August et al. |
| 5,673,089 A | 9/1997 | Yuen et al. |
| 5,675,390 A | 10/1997 | Schindler et al. |
| 5,675,575 A | 10/1997 | Wall, Jr. et al. |
| 5,682,195 A | 10/1997 | Hendricks et al. |
| 5,682,511 A | 10/1997 | Sposato et al. |
| 5,684,525 A | 11/1997 | Klosterman |
| 5,684,918 A | 11/1997 | Abecassis |
| 5,687,331 A | 11/1997 | Volk et al. |
| 5,689,501 A | 11/1997 | Takase et al. |
| 5,689,553 A | 11/1997 | Ahuja et al. |
| 5,689,555 A | 11/1997 | Sonnenberg |
| 5,689,663 A | 11/1997 | Williams |
| 5,692,214 A | 11/1997 | Levine |
| 5,694,176 A | 12/1997 | Bruette et al. |
| 5,696,815 A | 12/1997 | Smyk |
| 5,696,906 A | 12/1997 | Peters et al. |
| 5,699,107 A | 12/1997 | Lawler et al. |
| 5,701,383 A | 12/1997 | Russo et al. |
| 5,701,610 A | 12/1997 | Hsu |
| 5,703,877 A | 12/1997 | Nuber et al. |
| 5,703,965 A | 12/1997 | Fu et al. |
| 5,706,342 A | 1/1998 | Baeder et al. |
| 5,708,961 A | 1/1998 | Hylton et al. |
| 5,710,601 A | 1/1998 | Marshall et al. |
| 5,710,610 A | 1/1998 | Kim |
| 5,712,907 A | 1/1998 | Wegner et al. |
| 5,714,273 A | 2/1998 | Wake et al. |
| 5,715,315 A | 2/1998 | Handelman |
| 5,715,515 A | 2/1998 | Akins, III et al. |
| 5,716,273 A | 2/1998 | Yuen |
| 5,719,646 A | 2/1998 | Kikuchi et al. |
| 5,721,956 A | 2/1998 | Martin et al. |
| 5,724,091 A | 3/1998 | Freeman et al. |
| 5,724,203 A | 3/1998 | Kwoh et al. |

(56) References Cited

U.S. PATENT DOCUMENTS

| | | |
|---|---|---|
| 5,724,355 A | 3/1998 | Bruno et al. |
| 5,724,411 A | 3/1998 | Eisdorfer et al. |
| 5,724,412 A | 3/1998 | Srinivasan |
| 5,724,521 A | 3/1998 | Dedrick |
| 5,724,525 A | 3/1998 | Beyers, II et al. |
| 5,724,543 A | 3/1998 | Ozden et al. |
| 5,724,646 A | 3/1998 | Ganek et al. |
| 5,727,060 A | 3/1998 | Young |
| 5,727,065 A | 3/1998 | Dillon |
| 5,729,471 A | 3/1998 | Jain et al. |
| 5,729,549 A | 3/1998 | Kostreski et al. |
| 5,731,844 A | 3/1998 | Rauch et al. |
| 5,732,217 A | 3/1998 | Emura |
| 5,734,589 A | 3/1998 | Kostreski et al. |
| 5,734,853 A | 3/1998 | Hendricks et al. |
| 5,737,333 A | 4/1998 | Civanlar et al. |
| 5,737,533 A | 4/1998 | de Hond |
| 5,737,725 A | 4/1998 | Case |
| 5,740,230 A | 4/1998 | Vaudreuil |
| 5,740,231 A | 4/1998 | Cohn et al. |
| 5,742,596 A | 4/1998 | Baratz et al. |
| 5,742,680 A | 4/1998 | Wilson |
| 5,742,905 A | 4/1998 | Pepe et al. |
| 5,744,170 A | 4/1998 | Hall |
| 5,745,556 A | 4/1998 | Ronen |
| 5,745,710 A | 4/1998 | Clanton, III et al. |
| 5,745,882 A | 4/1998 | Bixler et al. |
| 5,751,282 A | 5/1998 | Girard et al. |
| 5,751,706 A | 5/1998 | Land et al. |
| 5,751,760 A | 5/1998 | Fuller et al. |
| 5,754,775 A | 5/1998 | Adamson et al. |
| 5,754,783 A | 5/1998 | Mendelson et al. |
| 5,754,938 A | 5/1998 | Herz et al. |
| 5,754,940 A | 5/1998 | Smith et al. |
| 5,757,416 A | 5/1998 | Birch et al. |
| 5,758,257 A | 5/1998 | Herz et al. |
| 5,758,259 A | 5/1998 | Lawler |
| 5,764,276 A | 6/1998 | Martin et al. |
| 5,764,739 A | 6/1998 | Patton et al. |
| 5,764,752 A | 6/1998 | Waite et al. |
| 5,768,491 A | 6/1998 | Lobodzinski et al. |
| 5,768,513 A | 6/1998 | Kuthyar et al. |
| 5,768,539 A | 6/1998 | Metz et al. |
| 5,768,551 A | 6/1998 | Bleiweiss et al. |
| 5,771,064 A | 6/1998 | Lett |
| 5,774,122 A | 6/1998 | Kojima et al. |
| 5,774,170 A | 6/1998 | Hite et al. |
| 5,778,173 A | 7/1998 | Apte |
| 5,780,474 A | 7/1998 | Peglion et al. |
| 5,781,228 A | 7/1998 | Sposato |
| 5,784,095 A | 7/1998 | Robbins et al. |
| 5,784,444 A | 7/1998 | Snyder et al. |
| 5,787,171 A | 7/1998 | Kubota et al. |
| 5,790,172 A | 8/1998 | Imanaka |
| 5,790,198 A | 8/1998 | Roop et al. |
| 5,790,806 A | 8/1998 | Koperda |
| 5,793,364 A | 8/1998 | Bolanos et al. |
| 5,793,410 A | 8/1998 | Rao |
| 5,793,413 A | 8/1998 | Hylton et al. |
| 5,793,438 A | 8/1998 | Bedard |
| 5,793,872 A | 8/1998 | Hirayama et al. |
| 5,796,394 A | 8/1998 | Wicks et al. |
| 5,796,424 A | 8/1998 | Ely et al. |
| 5,796,718 A | 8/1998 | Caterisano |
| 5,796,952 A | 8/1998 | Davis et al. |
| 5,798,785 A | 8/1998 | Hendricks et al. |
| 5,798,795 A | 8/1998 | Glenn et al. |
| 5,799,157 A | 8/1998 | Escallon |
| 5,801,747 A | 9/1998 | Bedard |
| 5,801,753 A | 9/1998 | Eyer et al. |
| 5,801,787 A | 9/1998 | Schein et al. |
| 5,802,045 A | 9/1998 | Kos et al. |
| 5,802,063 A | 9/1998 | Deiss |
| 5,802,160 A | 9/1998 | Kugell et al. |
| 5,802,510 A | 9/1998 | Jones |
| 5,805,155 A | 9/1998 | Allibhoy et al. |
| 5,805,204 A | 9/1998 | Thompson et al. |
| 5,805,587 A | 9/1998 | Norris et al. |
| 5,805,677 A | 9/1998 | Ferry et al. |
| 5,805,762 A | 9/1998 | Boyce et al. |
| 5,805,763 A | 9/1998 | Lawler et al. |
| 5,806,061 A | 9/1998 | Chaudhuri et al. |
| 5,808,608 A | 9/1998 | Young et al. |
| 5,809,128 A | 9/1998 | McMullin |
| 5,809,204 A | 9/1998 | Young et al. |
| 5,812,123 A | 9/1998 | Rowe et al. |
| 5,812,205 A | 9/1998 | Milnes et al. |
| 5,812,754 A | 9/1998 | Lui et al. |
| 5,812,786 A | 9/1998 | Seazholtz et al. |
| 5,815,145 A | 9/1998 | Matthews, III |
| 5,815,196 A | 9/1998 | Alshawi |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,819,301 A | 10/1998 | Rowe et al. |
| 5,822,123 A | 10/1998 | Davis et al. |
| 5,822,324 A | 10/1998 | Kostresti et al. |
| 5,825,829 A | 10/1998 | Borazjani et al. |
| 5,825,862 A | 10/1998 | Voit et al. |
| 5,826,110 A | 10/1998 | Ozden et al. |
| 5,828,420 A | 10/1998 | Marshall et al. |
| 5,828,945 A | 10/1998 | Klosterman |
| RE35,954 E | 11/1998 | Levine |
| 5,829,733 A | 11/1998 | Becker |
| 5,832,221 A | 11/1998 | Jones |
| 5,833,468 A | 11/1998 | Guy et al. |
| 5,835,087 A | 11/1998 | Herz et al. |
| 5,835,792 A | 11/1998 | Wise et al. |
| 5,838,368 A | 11/1998 | Masunaga et al. |
| 5,838,383 A | 11/1998 | Chimoto et al. |
| 5,838,678 A | 11/1998 | Davis et al. |
| 5,838,873 A | 11/1998 | Blatter et al. |
| 5,841,433 A | 11/1998 | Chaney |
| 5,844,600 A | 12/1998 | Kerr |
| 5,844,620 A | 12/1998 | Coleman et al. |
| 5,844,890 A | 12/1998 | Delp et al. |
| 5,847,771 A | 12/1998 | Cloutier et al. |
| 5,848,396 A | 12/1998 | Gerace |
| 5,850,218 A | 12/1998 | LaJoie et al. |
| 5,850,232 A | 12/1998 | Engstrom et al. |
| 5,850,340 A | 12/1998 | York |
| 5,850,429 A | 12/1998 | Joyce et al. |
| 5,852,478 A | 12/1998 | Kwoh |
| 5,854,840 A | 12/1998 | Cannella, Jr. |
| 5,855,020 A | 12/1998 | Kirsch |
| 5,859,660 A | 1/1999 | Perkins et al. |
| 5,859,895 A | 1/1999 | Pomp et al. |
| 5,859,902 A | 1/1999 | Freedman |
| 5,859,949 A | 1/1999 | Yanagihara |
| 5,861,881 A | 1/1999 | Freeman et al. |
| 5,861,906 A | 1/1999 | Dunn et al. |
| 5,864,546 A | 1/1999 | Campanella |
| 5,867,208 A | 2/1999 | McLaren |
| 5,867,495 A | 2/1999 | Elliott et al. |
| 5,870,150 A | 2/1999 | Yuen |
| 5,870,474 A | 2/1999 | Wasilewski et al. |
| 5,870,565 A | 2/1999 | Glitho |
| 5,877,801 A | 3/1999 | Martin et al. |
| 5,880,768 A | 3/1999 | Lemmons et al. |
| 5,880,769 A | 3/1999 | Nemirofsky et al. |
| 5,883,677 A | 3/1999 | Hofmann |
| 5,883,942 A | 3/1999 | Lim et al. |
| 5,887,259 A | 3/1999 | Zicker et al. |
| 5,890,122 A | 3/1999 | Van Kleeck et al. |
| 5,892,508 A | 4/1999 | Howe et al. |
| 5,894,328 A | 4/1999 | Negishi |
| 5,894,504 A | 4/1999 | Alfred et al. |
| 5,896,444 A | 4/1999 | Perlman et al. |
| 5,898,668 A | 4/1999 | Shaffer |
| 5,898,780 A | 4/1999 | Liu et al. |
| RE36,207 E | 5/1999 | Zimmermann et al. |
| 5,903,314 A | 5/1999 | Niijima et al. |

(56) References Cited

U.S. PATENT DOCUMENTS

| | | |
|---|---|---|
| 5,903,319 A | 5/1999 | Busko et al. |
| 5,903,816 A | 5/1999 | Broadwin et al. |
| 5,907,323 A | 5/1999 | Lawler et al. |
| 5,907,547 A | 5/1999 | Foladare et al. |
| 5,907,598 A | 5/1999 | Mandalia et al. |
| 5,907,604 A | 5/1999 | Hsu |
| 5,909,638 A | 6/1999 | Allen |
| 5,912,952 A | 6/1999 | Brendzel |
| 5,912,962 A | 6/1999 | Bosco |
| 5,914,757 A | 6/1999 | Dean et al. |
| 5,915,068 A | 6/1999 | Levine |
| 5,916,302 A | 6/1999 | Dunn et al. |
| 5,917,537 A | 6/1999 | Lightfoot et al. |
| 5,917,553 A | 6/1999 | Honey et al. |
| 5,917,624 A | 6/1999 | Wagner |
| 5,917,830 A | 6/1999 | Chen et al. |
| 5,917,915 A | 6/1999 | Hirose |
| 5,920,705 A | 7/1999 | Lyon et al. |
| 5,923,731 A | 7/1999 | McClure |
| 5,926,230 A | 7/1999 | Niijima et al. |
| 5,928,335 A | 7/1999 | Morita |
| 5,929,849 A | 7/1999 | Kikinis |
| 5,929,932 A | 7/1999 | Otsuki et al. |
| 5,930,340 A | 7/1999 | Bell |
| 5,933,141 A | 8/1999 | Smith |
| 5,940,073 A | 8/1999 | Klosterman et al. |
| 5,940,738 A | 8/1999 | Rao |
| 5,944,795 A | 8/1999 | Civanlar |
| 5,945,987 A | 8/1999 | Dunn |
| 5,946,381 A | 8/1999 | Danne et al. |
| 5,946,386 A | 8/1999 | Rogers et al. |
| 5,949,476 A | 9/1999 | Pocock et al. |
| 5,949,792 A | 9/1999 | Yasuda et al. |
| 5,951,639 A | 9/1999 | MacInnis |
| 5,953,458 A | 9/1999 | Pirson et al. |
| 5,956,088 A | 9/1999 | Shen et al. |
| 5,956,716 A | 9/1999 | Kenner et al. |
| 5,956,717 A | 9/1999 | Kraay et al. |
| 5,957,695 A | 9/1999 | Redford et al. |
| 5,965,088 A | 10/1999 | Lever et al. |
| 5,966,120 A | 10/1999 | Arazi et al. |
| 5,966,162 A | 10/1999 | Goode et al. |
| 5,970,072 A | 10/1999 | Gammenthaler, Jr. et al. |
| 5,970,473 A | 10/1999 | Gerszberg et al. |
| 5,978,043 A | 11/1999 | Blonstein et al. |
| 5,978,470 A | 11/1999 | Shaffer et al. |
| 5,978,855 A | 11/1999 | Metz et al. |
| 5,982,445 A | 11/1999 | Eyer et al. |
| 5,982,774 A | 11/1999 | Foladare et al. |
| 5,982,784 A | 11/1999 | Bell |
| 5,983,176 A | 11/1999 | Hoffert et al. |
| 5,986,650 A | 11/1999 | Ellis et al. |
| 5,986,690 A | 11/1999 | Hendricks |
| 5,987,100 A | 11/1999 | Fortman et al. |
| 5,987,245 A | 11/1999 | Gish |
| 5,987,508 A | 11/1999 | Agraharam et al. |
| 5,990,927 A | 11/1999 | Hendricks et al. |
| 5,990,972 A | 11/1999 | Bond-Harris et al. |
| 5,991,380 A | 11/1999 | Bruno et al. |
| 5,991,735 A | 11/1999 | Gerace |
| 5,991,799 A | 11/1999 | Yen et al. |
| 5,995,095 A | 11/1999 | Ratakonda |
| 5,995,606 A | 11/1999 | Civanlar et al. |
| 5,999,173 A | 12/1999 | Ubillos |
| 5,999,525 A | 12/1999 | Krishnaswamy et al. |
| 5,999,598 A | 12/1999 | Henrick et al. |
| 5,999,602 A | 12/1999 | Yang et al. |
| 5,999,612 A | 12/1999 | Dunn et al. |
| 6,002,394 A | 12/1999 | Schein et al. |
| 6,002,444 A | 12/1999 | Marshall et al. |
| 6,005,561 A | 12/1999 | Hawkins et al. |
| 6,005,562 A | 12/1999 | Shiga et al. |
| 6,005,565 A | 12/1999 | Legall et al. |
| 6,005,601 A | 12/1999 | Ohkura et al. |
| 6,005,631 A | 12/1999 | Anderson et al. |
| 6,005,861 A | 12/1999 | Humpleman |
| 6,005,873 A | 12/1999 | Amit |
| 6,006,225 A | 12/1999 | Bowman et al. |
| 6,006,253 A | 12/1999 | Kumar et al. |
| 6,006,256 A | 12/1999 | Zdepski et al. |
| 6,008,803 A | 12/1999 | Rowe et al. |
| 6,009,410 A | 12/1999 | LeMole et al. |
| 6,011,909 A | 1/2000 | Newlin et al. |
| 6,014,184 A | 1/2000 | Knee et al. |
| 6,014,368 A | 1/2000 | Sanami |
| 6,014,427 A | 1/2000 | Hanson et al. |
| 6,016,141 A | 1/2000 | Knudson et al. |
| 6,016,144 A | 1/2000 | Blonstein et al. |
| 6,016,336 A | 1/2000 | Hanson |
| 6,018,372 A | 1/2000 | Etheredge |
| 6,020,915 A | 2/2000 | Bruno et al. |
| 6,022,223 A | 2/2000 | Taniguchi et al. |
| 6,023,724 A | 2/2000 | Bhatia et al. |
| 6,025,637 A | 2/2000 | Mehta |
| 6,025,837 A | 2/2000 | Matthews, III et al. |
| 6,026,441 A | 2/2000 | Ronen |
| 6,028,848 A | 2/2000 | Bhatia et al. |
| 6,028,867 A | 2/2000 | Rawson et al. |
| 6,029,045 A | 2/2000 | Picco et al. |
| 6,031,680 A | 2/2000 | Chainer et al. |
| 6,031,896 A | 2/2000 | Gardell et al. |
| 6,031,899 A | 2/2000 | Wu |
| 6,031,906 A | 2/2000 | Rao |
| 6,034,677 A | 3/2000 | Noguchi et al. |
| 6,038,000 A | 3/2000 | Hurst, Jr. |
| 6,038,233 A | 3/2000 | Hamamoto et al. |
| 6,040,867 A | 3/2000 | Bando et al. |
| 6,044,396 A | 3/2000 | Adams |
| 6,044,403 A | 3/2000 | Gerszberg et al. |
| 6,047,063 A | 4/2000 | Perry |
| 6,049,594 A | 4/2000 | Furman et al. |
| 6,049,831 A | 4/2000 | Gardell et al. |
| 6,052,444 A | 4/2000 | Ferry et al. |
| 6,052,594 A | 4/2000 | Chuang et al. |
| 6,052,717 A | 4/2000 | Reynolds et al. |
| 6,052,725 A | 4/2000 | McCann et al. |
| 6,061,097 A | 5/2000 | Satterfield |
| 6,061,399 A | 5/2000 | Lyons et al. |
| 6,061,434 A | 5/2000 | Corbett |
| 6,061,451 A | 5/2000 | Muratani et al. |
| 6,062,868 A | 5/2000 | Toriumi |
| 6,064,376 A | 5/2000 | Berezowski et al. |
| 6,069,879 A | 5/2000 | Chatter |
| 6,075,575 A | 6/2000 | Schein et al. |
| 6,075,796 A | 6/2000 | Katseff et al. |
| 6,078,886 A | 6/2000 | Dragosh et al. |
| 6,084,292 A | 7/2000 | Shinohara |
| 6,085,231 A | 7/2000 | Agraharam et al. |
| 6,088,368 A | 7/2000 | Rubinstain et al. |
| 6,088,732 A | 7/2000 | Smith et al. |
| 6,094,680 A | 7/2000 | Hokanson |
| 6,099,320 A | 8/2000 | Papadopoulos |
| 6,101,246 A | 8/2000 | Heinmiller et al. |
| 6,101,324 A | 8/2000 | Connell et al. |
| 6,104,391 A | 8/2000 | Johnston, Jr. et al. |
| 6,104,704 A | 8/2000 | Buhler et al. |
| 6,104,800 A | 8/2000 | Benson |
| 6,108,330 A | 8/2000 | Bhatia et al. |
| 6,115,393 A | 9/2000 | Engel et al. |
| 6,118,432 A | 9/2000 | Kotorov et al. |
| 6,118,768 A | 9/2000 | Bhatia et al. |
| 6,118,778 A | 9/2000 | Amin |
| 6,118,784 A | 9/2000 | Tsuchiya et al. |
| 6,119,154 A | 9/2000 | Weaver et al. |
| 6,119,454 A | 9/2000 | Valisko |
| 6,122,357 A | 9/2000 | Farris et al. |
| 6,125,376 A | 9/2000 | Klarlund et al. |
| 6,128,009 A | 10/2000 | Ohkura et al. |
| 6,128,304 A | 10/2000 | Gardell et al. |
| 6,130,898 A | 10/2000 | Kostreski et al. |
| 6,131,161 A | 10/2000 | Linnartz |
| 6,134,235 A | 10/2000 | Goldman et al. |
| 6,137,870 A | 10/2000 | Scherer |
| 6,138,100 A | 10/2000 | Dutton et al. |

(56) References Cited

U.S. PATENT DOCUMENTS

| | | | |
|---|---|---|---|
| 6,138,147 | A | 10/2000 | Weaver et al. |
| 6,141,003 | A | 10/2000 | Chor et al. |
| 6,141,385 | A | 10/2000 | Yamaji |
| 6,141,448 | A | 10/2000 | Khansari et al. |
| 6,141,693 | A | 10/2000 | Perlman et al. |
| 6,144,401 | A | 11/2000 | Casement et al. |
| 6,144,667 | A | 11/2000 | Doshi et al. |
| 6,144,944 | A | 11/2000 | Kurtzman, II et al. |
| 6,147,714 | A | 11/2000 | Terasawa et al. |
| 6,148,067 | A | 11/2000 | Leipow |
| 6,151,059 | A | 11/2000 | Schein et al. |
| 6,154,531 | A | 11/2000 | Clapper |
| 6,154,633 | A | 11/2000 | Landgraf et al. |
| RE36,988 | E | 12/2000 | Johnson et al. |
| 6,157,673 | A | 12/2000 | Cuccia |
| 6,160,545 | A | 12/2000 | Eyer et al. |
| 6,160,546 | A | 12/2000 | Thompson et al. |
| 6,160,880 | A | 12/2000 | Allen |
| 6,163,316 | A | 12/2000 | Killian |
| 6,163,345 | A | 12/2000 | Noguchi et al. |
| 6,163,531 | A | 12/2000 | Kumar |
| 6,166,778 | A | 12/2000 | Yamamoto et al. |
| 6,167,043 | A | 12/2000 | Frantz |
| 6,167,188 | A | 12/2000 | Young et al. |
| 6,169,843 | B1 | 1/2001 | Lenihan et al. |
| 6,172,674 | B1 | 1/2001 | Etheredge |
| 6,172,677 | B1 | 1/2001 | Stautner et al. |
| 6,172,687 | B1 | 1/2001 | Kitamura et al. |
| 6,173,250 | B1 | 1/2001 | Jong |
| 6,173,330 | B1 | 1/2001 | Guo et al. |
| 6,175,619 | B1 | 1/2001 | DeSimone |
| 6,177,930 | B1 | 1/2001 | Chernock et al. |
| 6,177,931 | B1 | 1/2001 | Alexander et al. |
| 6,178,446 | B1 | 1/2001 | Gerszberg et al. |
| 6,182,028 | B1 | 1/2001 | Karaali et al. |
| 6,182,050 | B1 | 1/2001 | Ballard |
| 6,182,072 | B1 | 1/2001 | Leak et al. |
| 6,182,287 | B1 | 1/2001 | Schneidewend et al. |
| 6,185,288 | B1 | 2/2001 | Wong |
| 6,188,725 | B1 | 2/2001 | Sugiyama |
| 6,188,756 | B1 | 2/2001 | Mashinsky |
| 6,191,782 | B1 | 2/2001 | Mori et al. |
| 6,192,116 | B1 | 2/2001 | Mayak |
| 6,198,478 | B1 | 3/2001 | Ota et al. |
| 6,201,536 | B1 | 3/2001 | Hendricks et al. |
| 6,201,797 | B1 | 3/2001 | Leuca et al. |
| 6,204,885 | B1 | 3/2001 | Kwoh |
| 6,208,335 | B1 | 3/2001 | Gordon et al. |
| 6,209,028 | B1 | 3/2001 | Walker et al. |
| 6,209,129 | B1 | 3/2001 | Carr et al. |
| 6,209,130 | B1 | 3/2001 | Rector, Jr. et al. |
| 6,212,680 | B1 | 4/2001 | Tsinberg et al. |
| 6,212,860 | B1 | 4/2001 | Preisner et al. |
| 6,219,839 | B1 | 4/2001 | Sampsell |
| 6,222,531 | B1 | 4/2001 | Smith |
| 6,229,810 | B1 | 5/2001 | Gerszberg et al. |
| 6,229,887 | B1 | 5/2001 | Albers et al. |
| 6,230,322 | B1 | 5/2001 | Saib et al. |
| 6,230,324 | B1 | 5/2001 | Tomita et al. |
| 6,233,226 | B1 | 5/2001 | Gringeri et al. |
| 6,233,235 | B1 | 5/2001 | Burke et al. |
| 6,233,313 | B1 | 5/2001 | Farris et al. |
| 6,239,794 | B1 | 5/2001 | Yuen et al. |
| 6,240,555 | B1 | 5/2001 | Shoff et al. |
| 6,243,142 | B1 | 6/2001 | Mugura et al. |
| 6,243,388 | B1 | 6/2001 | Mussman et al. |
| 6,243,445 | B1 | 6/2001 | Begeja et al. |
| 6,243,713 | B1 | 6/2001 | Nelson et al. |
| 6,252,690 | B1 | 6/2001 | Laine |
| 6,252,952 | B1 | 6/2001 | Kung et al. |
| 6,256,785 | B1 | 7/2001 | Klappert et al. |
| 6,259,487 | B1 | 7/2001 | Bril |
| 6,260,192 | B1 | 7/2001 | Rosin et al. |
| 6,262,722 | B1 | 7/2001 | Allison et al. |
| 6,262,979 | B1 | 7/2001 | Anderson et al. |
| 6,263,065 | B1 | 7/2001 | Durinovic-Johri et al. |
| 6,263,501 | B1 | 7/2001 | Schein et al. |
| 6,263,503 | B1 | 7/2001 | Margulis |
| 6,266,340 | B1 | 7/2001 | Pickett et al. |
| 6,266,405 | B1 | 7/2001 | Madour et al. |
| 6,268,849 | B1 | 7/2001 | Boyer et al. |
| 6,279,112 | B1 | 8/2001 | O'Toole, Jr. et al. |
| 6,282,713 | B1 | 8/2001 | Kitsukawa et al. |
| 6,285,750 | B1 | 9/2001 | Brachman et al. |
| 6,286,006 | B1 | 9/2001 | Bharat et al. |
| 6,288,738 | B1 | 9/2001 | Dureau et al. |
| 6,288,753 | B1 | 9/2001 | DeNicola et al. |
| 6,289,025 | B1 | 9/2001 | Pang et al. |
| 6,292,553 | B1 | 9/2001 | Fellingham et al. |
| 6,295,298 | B1 | 9/2001 | Hrastar et al. |
| 6,298,120 | B1 | 10/2001 | Civanlar et al. |
| 6,298,482 | B1 | 10/2001 | Seidman et al. |
| 6,300,947 | B1 | 10/2001 | Kanevsky |
| 6,304,566 | B1 | 10/2001 | Schessel |
| 6,304,573 | B1 | 10/2001 | Hicks, III |
| 6,304,636 | B1 | 10/2001 | Goldberg et al. |
| 6,305,016 | B1 | 10/2001 | Marshall et al. |
| 6,310,889 | B1 | 10/2001 | Parsons et al. |
| 6,312,336 | B1 | 11/2001 | Handelman et al. |
| 6,317,684 | B1 | 11/2001 | Roeseler et al. |
| 6,317,884 | B1 | 11/2001 | Eames et al. |
| 6,324,279 | B1 | 11/2001 | Kalmanek, Jr. et al. |
| 6,327,346 | B1 | 12/2001 | Infosino |
| 6,327,574 | B1 | 12/2001 | Kramer et al. |
| 6,331,877 | B1 | 12/2001 | Bennington et al. |
| 6,332,139 | B1 | 12/2001 | Kaneko et al. |
| 6,333,931 | B1 | 12/2001 | LaPier et al. |
| 6,339,594 | B1 | 1/2002 | Civanlar et al. |
| 6,343,074 | B1 | 1/2002 | Pickett |
| 6,343,115 | B1 | 1/2002 | Foladare et al. |
| 6,347,075 | B1 | 2/2002 | Barzegar et al. |
| 6,351,464 | B1 | 2/2002 | Galvin et al. |
| 6,353,611 | B1 | 3/2002 | Norris et al. |
| 6,356,546 | B1 | 3/2002 | Beshai |
| 6,357,043 | B1 | 3/2002 | Ellis et al. |
| 6,357,046 | B1 | 3/2002 | Thompson et al. |
| 6,359,881 | B1 | 3/2002 | Gerszberg et al. |
| 6,359,910 | B1 | 3/2002 | Takahashi |
| 6,363,411 | B1 | 3/2002 | Dugan et al. |
| 6,366,578 | B1 | 4/2002 | Johnson |
| 6,370,543 | B2 | 4/2002 | Hoffert et al. |
| 6,373,817 | B1 | 4/2002 | Kung et al. |
| 6,374,124 | B1 | 4/2002 | Slabinski |
| 6,385,202 | B1 | 5/2002 | Katseff et al. |
| 6,385,646 | B1 | 5/2002 | Brown et al. |
| 6,385,771 | B1 | 5/2002 | Gordon |
| 6,388,714 | B1 | 5/2002 | Schein et al. |
| 6,389,114 | B1 | 5/2002 | Dowens et al. |
| 6,389,477 | B1 | 5/2002 | Simmon et al. |
| 6,393,014 | B1 | 5/2002 | Daly et al. |
| 6,393,017 | B1 | 5/2002 | Galvin et al. |
| 6,401,242 | B1 | 6/2002 | Eyer et al. |
| 6,404,735 | B1 | 6/2002 | Beshai et al. |
| 6,404,818 | B1 | 6/2002 | Obikane |
| 6,405,371 | B1 | 6/2002 | Oosterhout et al. |
| 6,414,970 | B1 | 7/2002 | Negishi et al. |
| 6,415,437 | B1 | 7/2002 | Ludvig et al. |
| 6,418,139 | B1 | 7/2002 | Akhtar |
| 6,418,146 | B1 | 7/2002 | Miloslavsky |
| 6,418,433 | B1 | 7/2002 | Chakrabarti et al. |
| 6,421,067 | B1 | 7/2002 | Kamen et al. |
| 6,421,359 | B1 | 7/2002 | Bennett et al. |
| 6,421,425 | B1 | 7/2002 | Bossi et al. |
| 6,424,646 | B1 | 7/2002 | Gerszberg et al. |
| 6,425,131 | B2 | 7/2002 | Crandall et al. |
| 6,425,133 | B1 | 7/2002 | Leary |
| 6,426,779 | B1 | 7/2002 | Noguchi et al. |
| 6,437,692 | B1 | 8/2002 | Petite et al. |
| 6,438,222 | B1 | 8/2002 | Burg |
| 6,438,223 | B1 | 8/2002 | Eskafi et al. |
| 6,442,266 | B1 | 8/2002 | Wu |
| 6,442,755 | B1 | 8/2002 | Lemmons et al. |
| 6,446,261 | B1 | 9/2002 | Rosser |
| 6,449,654 | B1 | 9/2002 | Blackwell et al. |

(56) References Cited

U.S. PATENT DOCUMENTS

| | | |
|---|---|---|
| 6,449,766 B1 | 9/2002 | Fleming |
| 6,452,923 B1 | 9/2002 | Gerszberg et al. |
| 6,453,471 B1 | 9/2002 | Klosterman |
| 6,456,699 B1 | 9/2002 | Burg et al. |
| 6,456,782 B1 | 9/2002 | Kubota et al. |
| 6,457,010 B1 | 9/2002 | Eldering et al. |
| 6,459,427 B1 | 10/2002 | Mao et al. |
| 6,459,913 B2 | 10/2002 | Cloutier |
| 6,460,018 B1 | 10/2002 | Kasai et al. |
| 6,460,181 B1 | 10/2002 | Donnelly |
| 6,463,468 B1 | 10/2002 | Buch et al. |
| 6,463,585 B1 | 10/2002 | Hendricks et al. |
| 6,463,586 B1 | 10/2002 | Jerding |
| 6,466,970 B1 | 10/2002 | Lee et al. |
| 6,467,090 B1 | 10/2002 | Brodigan |
| 6,469,753 B1 | 10/2002 | Klosterman et al. |
| 6,470,460 B1 | 10/2002 | Kashiwagi et al. |
| 6,473,425 B1 | 10/2002 | Bellaton et al. |
| 6,473,804 B1 | 10/2002 | Kaiser et al. |
| 6,477,705 B1 | 11/2002 | Yuen et al. |
| 6,480,748 B1 | 11/2002 | Gerszberg et al. |
| 6,481,010 B2 | 11/2002 | Nishikawa et al. |
| 6,481,011 B1 | 11/2002 | Lemmons |
| 6,481,012 B1 | 11/2002 | Gordon et al. |
| 6,486,892 B1 | 11/2002 | Stern |
| 6,487,722 B1 | 11/2002 | Okura et al. |
| 6,490,274 B1 | 12/2002 | Kim |
| 6,490,728 B1 | 12/2002 | Kitazato et al. |
| 6,493,324 B1 | 12/2002 | Truetken |
| 6,493,872 B1 | 12/2002 | Rangan et al. |
| 6,501,740 B1 | 12/2002 | Sun et al. |
| 6,505,348 B1 | 1/2003 | Knowles et al. |
| 6,510,152 B1 | 1/2003 | Gerszberg et al. |
| 6,510,555 B1 | 1/2003 | Tsurumoto |
| 6,515,680 B1 | 2/2003 | Hendricks et al. |
| 6,518,986 B1 | 2/2003 | Mugura |
| 6,519,009 B1 | 2/2003 | Hanaya et al. |
| 6,519,246 B1 | 2/2003 | Strahs |
| 6,519,249 B1 | 2/2003 | Bennefeld et al. |
| 6,522,628 B1 | 2/2003 | Patel et al. |
| 6,526,577 B1 | 2/2003 | Knudson et al. |
| 6,530,082 B1 | 3/2003 | Del Sesto et al. |
| 6,532,286 B1 | 3/2003 | Burg |
| 6,532,590 B1 | 3/2003 | Chimoto |
| 6,539,548 B1 | 3/2003 | Hendricks et al. |
| 6,542,500 B1 | 4/2003 | Gerszberg et al. |
| 6,542,518 B1 | 4/2003 | Miyazawa |
| 6,547,829 B1 | 4/2003 | Meyerzon et al. |
| 6,560,222 B1 | 5/2003 | Pounds et al. |
| 6,567,106 B1 | 5/2003 | Wugofski |
| 6,570,855 B1 | 5/2003 | Kung et al. |
| 6,570,974 B1 | 5/2003 | Gerszberg et al. |
| 6,573,942 B1 | 6/2003 | Crinon |
| 6,577,350 B1 | 6/2003 | Proehl et al. |
| 6,578,201 B1 | 6/2003 | LaRocca et al. |
| 6,580,441 B2 | 6/2003 | Schileru-Key |
| 6,584,125 B1 | 6/2003 | Katto |
| 6,584,153 B1 | 6/2003 | Gordon et al. |
| 6,588,014 B1 | 7/2003 | Hayashi |
| 6,590,867 B1 | 7/2003 | Ash et al. |
| 6,594,271 B1 | 7/2003 | Wu et al. |
| 6,606,746 B1 | 8/2003 | Zdepski et al. |
| 6,618,717 B1 | 9/2003 | Karadimitriou et al. |
| 6,621,870 B1 | 9/2003 | Gordon et al. |
| 6,625,810 B1 | 9/2003 | Murphy et al. |
| 6,633,635 B2 | 10/2003 | Kung et al. |
| 6,633,848 B1 | 10/2003 | Johnson et al. |
| 6,637,029 B1 | 10/2003 | Maissel et al. |
| 6,638,314 B1 | 10/2003 | Meyerzon et al. |
| 6,640,239 B1 | 10/2003 | Gidwani |
| 6,650,901 B1 | 11/2003 | Schuster et al. |
| 6,651,252 B1 | 11/2003 | Gordon et al. |
| 6,651,253 B2 | 11/2003 | Dudkiewicz et al. |
| 6,671,882 B1 | 12/2003 | Murphy et al. |
| 6,675,385 B1 | 1/2004 | Wang |
| 6,675,387 B1 | 1/2004 | Boucher et al. |
| 6,681,395 B1 | 1/2004 | Nishi |
| 6,687,360 B2 | 2/2004 | Kung et al. |
| 6,690,675 B1 | 2/2004 | Kung et al. |
| 6,694,352 B1 | 2/2004 | Omoigui |
| 6,698,020 B1 | 2/2004 | Zigmond et al. |
| 6,704,028 B2 | 3/2004 | Wugofski |
| 6,704,359 B1 | 3/2004 | Bayrakeri et al. |
| 6,715,129 B1 * | 3/2004 | Hind .................. G06F 17/24 715/234 |
| 6,741,617 B2 | 5/2004 | Rosengren et al. |
| 6,744,767 B1 | 6/2004 | Chiu et al. |
| 6,751,612 B1 | 6/2004 | Schuetze et al. |
| 6,754,905 B2 | 6/2004 | Gordon et al. |
| 6,763,522 B1 | 7/2004 | Kondo et al. |
| 6,771,742 B2 | 8/2004 | McCalmont et al. |
| 6,772,150 B1 | 8/2004 | Whitman et al. |
| 6,775,267 B1 | 8/2004 | Kung et al. |
| 6,782,132 B1 | 8/2004 | Fogg |
| 6,791,561 B1 | 9/2004 | Dawson |
| 6,801,575 B1 * | 10/2004 | Crinon ............. H04N 21/23412 375/240.08 |
| 6,807,528 B1 | 10/2004 | Truman et al. |
| 6,826,173 B1 | 11/2004 | Kung et al. |
| 6,828,993 B1 | 12/2004 | Hendricks et al. |
| 6,836,476 B1 | 12/2004 | Dunn et al. |
| 6,839,705 B1 | 1/2005 | Grooters |
| 6,874,129 B2 | 3/2005 | Smith |
| 6,918,131 B1 | 7/2005 | Rautila et al. |
| 6,940,950 B2 | 9/2005 | Dickinson et al. |
| 6,954,897 B1 | 10/2005 | Noguchi et al. |
| 6,968,567 B1 | 11/2005 | Gordon et al. |
| 6,973,436 B1 | 12/2005 | Shkedi |
| 6,986,154 B1 | 1/2006 | Price et al. |
| 6,999,476 B2 | 2/2006 | Lerman et al. |
| 7,006,614 B2 | 2/2006 | Feinberg et al. |
| 7,027,564 B2 | 4/2006 | James |
| 7,042,985 B1 | 5/2006 | Wright |
| 7,054,313 B1 | 5/2006 | Gerszberg et al. |
| 7,062,777 B2 | 6/2006 | Alba et al. |
| 7,065,709 B2 | 6/2006 | Ellis et al. |
| 7,075,919 B1 | 7/2006 | Wendt et al. |
| 7,082,427 B1 | 7/2006 | Seibel et al. |
| 7,096,484 B2 | 8/2006 | Mao et al. |
| 7,099,443 B2 | 8/2006 | Phillips et al. |
| 7,100,185 B2 | 8/2006 | Bennington et al. |
| 7,110,006 B2 | 9/2006 | MacInnis et al. |
| 7,110,395 B1 | 9/2006 | Blair |
| 7,117,440 B2 | 10/2006 | Gordon et al. |
| 7,127,044 B1 | 10/2006 | Becker et al. |
| 7,134,133 B1 | 11/2006 | Wugofski |
| 7,137,135 B2 | 11/2006 | Schein et al. |
| 7,143,428 B1 | 11/2006 | Bruck et al. |
| 7,143,430 B1 | 11/2006 | Fingerman et al. |
| 7,149,499 B1 | 12/2006 | Oran et al. |
| 7,150,029 B1 | 12/2006 | Ebling et al. |
| 7,150,031 B1 | 12/2006 | Rodriguez et al. |
| 7,174,084 B2 | 2/2007 | Edmonds et al. |
| 7,177,399 B2 | 2/2007 | Dawson et al. |
| 7,178,158 B2 | 2/2007 | Nishina et al. |
| 7,180,988 B2 | 2/2007 | Phillips et al. |
| 7,181,401 B2 | 2/2007 | Johnson et al. |
| 7,194,032 B1 | 3/2007 | Easwar et al. |
| 7,239,698 B2 | 7/2007 | Phillips et al. |
| 7,257,387 B2 | 8/2007 | Laliberte |
| 7,260,186 B2 | 8/2007 | Zhu et al. |
| 7,315,881 B2 | 1/2008 | Menez |
| 7,343,614 B1 | 3/2008 | Hendricks et al. |
| 7,363,645 B1 | 4/2008 | Hendricks |
| 7,366,157 B1 | 4/2008 | Valentine et al. |
| 7,370,342 B2 | 5/2008 | Ismail et al. |
| 7,379,436 B2 | 5/2008 | Jiang |
| 7,379,455 B2 | 5/2008 | Pickett |
| 7,391,761 B1 | 6/2008 | Ruckart et al. |
| 7,404,200 B1 | 7/2008 | Hailey et al. |
| 7,424,439 B1 | 9/2008 | Fayyad et al. |
| 7,453,990 B2 | 11/2008 | Welenson et al. |
| 7,474,742 B2 | 1/2009 | Cook |
| 7,496,360 B2 | 2/2009 | Sindhwani et al. |

(56) References Cited

U.S. PATENT DOCUMENTS

| | | | |
|---|---|---|---|
| 7,503,003 B2 | 3/2009 | Kamen et al. |
| 7,505,919 B2 | 3/2009 | Richardson |
| 7,508,928 B1 | 3/2009 | Everson et al. |
| 7,573,988 B2 | 8/2009 | Lee et al. |
| 7,580,405 B2 | 8/2009 | Laliberte |
| 7,586,902 B2 | 9/2009 | Epley |
| 7,685,619 B1 | 3/2010 | Herz |
| 7,746,905 B2 | 6/2010 | Binder |
| 7,796,738 B2 | 9/2010 | Wright |
| 7,836,467 B2 | 11/2010 | Gordon et al. |
| 7,838,467 B2 | 11/2010 | Jones et al. |
| 7,843,923 B2 | 11/2010 | Baum |
| 7,843,934 B2 | 11/2010 | Baum et al. |
| 7,940,746 B2 | 5/2011 | Livingood |
| 8,032,906 B2 | 10/2011 | Gordon et al. |
| 8,060,905 B1 | 11/2011 | Hendricks |
| 8,265,587 B2 | 9/2012 | D'Evelyn et al. |
| 2001/0004382 A1 | 6/2001 | Van Wonterghem |
| 2001/0010095 A1 | 7/2001 | Ellis et al. |
| 2001/0012022 A1 | 8/2001 | Smith |
| 2001/0013123 A1 | 8/2001 | Freeman et al. |
| 2001/0025304 A1 | 9/2001 | Keith |
| 2001/0027493 A1 | 10/2001 | Wallace |
| 2001/0027557 A1 | 10/2001 | Shinkawa et al. |
| 2001/0037498 A1 | 11/2001 | Johansson |
| 2001/0039546 A1 | 11/2001 | Moore et al. |
| 2001/0056577 A1 | 12/2001 | Gordon et al. |
| 2002/0007493 A1 | 1/2002 | Butler et al. |
| 2002/0010682 A1 | 1/2002 | Johnson |
| 2002/0012353 A1 | 1/2002 | Gerszberg et al. |
| 2002/0013941 A1 | 1/2002 | Ward et al. |
| 2002/0026496 A1 | 2/2002 | Boyer et al. |
| 2002/0032740 A1 | 3/2002 | Stern et al. |
| 2002/0032907 A1 | 3/2002 | Daniels |
| 2002/0035728 A1 | 3/2002 | Fries |
| 2002/0038308 A1 | 3/2002 | Capri |
| 2002/0049679 A1 | 4/2002 | Russell et al. |
| 2002/0049971 A1 | 4/2002 | Augenbraun et al. |
| 2002/0056112 A1 | 5/2002 | Dureau et al. |
| 2002/0056129 A1 | 5/2002 | Blackketter et al. |
| 2002/0059610 A1 | 5/2002 | Ellis |
| 2002/0065812 A1 | 5/2002 | Keith |
| 2002/0065935 A1 | 5/2002 | Koperda et al. |
| 2002/0066102 A1 | 5/2002 | Chapman et al. |
| 2002/0066103 A1 | 5/2002 | Gagnon et al. |
| 2002/0087980 A1 | 7/2002 | Eldering et al. |
| 2002/0099697 A1 | 7/2002 | Jensen-Grey |
| 2002/0100046 A1 | 7/2002 | Dudkiewicz |
| 2002/0120933 A1 | 8/2002 | Knudson et al. |
| 2002/0129062 A1 | 9/2002 | Luparello |
| 2002/0147880 A1 | 10/2002 | Wang Baldonado |
| 2003/0020744 A1 | 1/2003 | Ellis et al. |
| 2003/0033299 A1 | 2/2003 | Sundaresan |
| 2003/0034982 A1 | 2/2003 | Talayssat et al. |
| 2003/0035007 A1 | 2/2003 | Wugofski |
| 2003/0046690 A1* | 3/2003 | Miller ............. H04H 20/10 725/36 |
| 2003/0052905 A1 | 3/2003 | Gordon et al. |
| 2003/0056216 A1 | 3/2003 | Wugofski et al. |
| 2003/0066085 A1 | 4/2003 | Boyer et al. |
| 2003/0081377 A1 | 5/2003 | Lin |
| 2003/0083533 A1 | 5/2003 | Gerba et al. |
| 2003/0091339 A1 | 5/2003 | Isozaki |
| 2003/0093792 A1* | 5/2003 | Labeeb ............ H04N 7/163 725/46 |
| 2003/0115603 A1 | 6/2003 | Lemmons et al. |
| 2003/0149988 A1 | 8/2003 | Ellis et al. |
| 2003/0200544 A1 | 10/2003 | Ellis et al. |
| 2003/0204393 A1 | 10/2003 | Czerwiec et al. |
| 2003/0206717 A1* | 11/2003 | Yogeshwar et al. ......... 386/69 |
| 2003/0209599 A1 | 11/2003 | Gatto |
| 2003/0214939 A1 | 11/2003 | Eldumiati et al. |
| 2004/0001479 A1 | 1/2004 | Pounds et al. |
| 2004/0001501 A1 | 1/2004 | Delveaux et al. |
| 2004/0057425 A1 | 3/2004 | Brouwer et al. |
| 2004/0073597 A1 | 4/2004 | Caveney et al. |
| 2004/0078824 A1 | 4/2004 | Krisbergh et al. |
| 2004/0096110 A1 | 5/2004 | Yogeshwar et al. |
| 2004/0107439 A1 | 6/2004 | Hassell et al. |
| 2004/0117831 A1 | 6/2004 | Ellis et al. |
| 2004/0125819 A1 | 7/2004 | Binder |
| 2004/0128686 A1 | 7/2004 | Boyer et al. |
| 2004/0140928 A1 | 7/2004 | Cleghorn |
| 2004/0151168 A1 | 8/2004 | Phillips et al. |
| 2004/0151290 A1 | 8/2004 | Magarasevic et al. |
| 2004/0153577 A1 | 8/2004 | Phillips et al. |
| 2004/0176085 A1 | 9/2004 | Phillips et al. |
| 2004/0203896 A1 | 10/2004 | Deigin et al. |
| 2004/0261105 A1 | 12/2004 | Marshall et al. |
| 2004/0261127 A1 | 12/2004 | Freeman et al. |
| 2005/0028208 A1 | 2/2005 | Ellis et al. |
| 2005/0083912 A1 | 4/2005 | Afshar et al. |
| 2005/0138660 A1 | 6/2005 | Boyer et al. |
| 2005/0141431 A1 | 6/2005 | Caveney et al. |
| 2005/0144645 A1 | 6/2005 | Casey et al. |
| 2005/0213565 A1 | 9/2005 | Barclay et al. |
| 2005/0213716 A1 | 9/2005 | Zhu et al. |
| 2005/0235200 A1 | 10/2005 | Goldberg |
| 2005/0235320 A1 | 10/2005 | Maze et al. |
| 2005/0243973 A1 | 11/2005 | Laliberte |
| 2005/0278741 A1 | 12/2005 | Robarts et al. |
| 2006/0056388 A1 | 3/2006 | Livingood |
| 2006/0120517 A1 | 6/2006 | Moon et al. |
| 2006/0188073 A1 | 8/2006 | Wright |
| 2006/0282852 A1 | 12/2006 | Purpura et al. |
| 2006/0293024 A1 | 12/2006 | Benco et al. |
| 2007/0011702 A1 | 1/2007 | Vaysman |
| 2007/0013516 A1 | 1/2007 | Freitag et al. |
| 2007/0089135 A1 | 4/2007 | Qureshey et al. |
| 2007/0092070 A1 | 4/2007 | Croy et al. |
| 2007/0147345 A1 | 6/2007 | Lowmaster |
| 2007/0259645 A1 | 11/2007 | Laliberte |
| 2009/0028153 A1 | 1/2009 | Koster et al. |
| 2009/0274145 A1 | 11/2009 | Laliberte |
| 2010/0029246 A1 | 2/2010 | Binning |
| 2011/0069183 A1 | 3/2011 | Edwards et al. |
| 2011/0116420 A1 | 5/2011 | Livingood |
| 2012/0013702 A1 | 1/2012 | Livingood |

FOREIGN PATENT DOCUMENTS

| | | |
|---|---|---|
| DE | 3935294 A1 | 4/1991 |
| DE | 4214184 A1 | 11/1992 |
| DE | 19755742 A1 | 6/1999 |
| EP | 103438 A1 | 3/1984 |
| EP | 145063 A2 | 6/1985 |
| EP | 149536 A2 | 7/1985 |
| EP | 158548 A1 | 10/1985 |
| EP | 0158767 A2 | 10/1985 |
| EP | 167237 A2 | 1/1986 |
| EP | 187961 A2 | 7/1986 |
| EP | 243312 A2 | 10/1987 |
| EP | 0277014 A2 | 8/1988 |
| EP | 0281293 A2 | 9/1988 |
| EP | 0299830 A1 | 1/1989 |
| EP | 0314572 A2 | 5/1989 |
| EP | 0328440 A1 | 8/1989 |
| EP | 0340643 A2 | 11/1989 |
| EP | 0355697 A2 | 2/1990 |
| EP | 0377334 A2 | 7/1990 |
| EP | 0390041 A2 | 10/1990 |
| EP | 0396186 A1 | 11/1990 |
| EP | 399200 A2 | 11/1990 |
| EP | 0402809 A2 | 12/1990 |
| EP | 0420123 A2 | 4/1991 |
| EP | 0424648 A2 | 5/1991 |
| EP | 425834 A2 | 5/1991 |
| EP | 450841 A2 | 10/1991 |
| EP | 0486989 A1 | 5/1992 |
| EP | 0488379 A1 | 6/1992 |
| EP | 0506435 A2 | 9/1992 |
| EP | 0513553 A2 | 11/1992 |
| EP | 513763 A2 | 11/1992 |
| EP | 0570785 A1 | 11/1993 |

(56) References Cited

FOREIGN PATENT DOCUMENTS

| | | |
|---|---|---|
| EP | 0586954 A2 | 3/1994 |
| EP | 0620689 A1 | 10/1994 |
| EP | 0646856 A2 | 4/1995 |
| EP | 0691787 A1 | 1/1996 |
| EP | 0702491 A1 | 3/1996 |
| EP | 0721253 A2 | 7/1996 |
| EP | 0725539 A2 | 8/1996 |
| EP | 0734157 A2 | 9/1996 |
| EP | 0821522 A2 | 1/1998 |
| EP | 0/838958 A1 | 4/1998 |
| EP | 0835915 A2 | 4/1998 |
| EP | 0838798 A1 | 4/1998 |
| EP | 0845904 A2 | 6/1998 |
| EP | 0892388 A1 | 1/1999 |
| EP | 0924629 A2 | 6/1999 |
| EP | 0924687 A2 | 6/1999 |
| EP | 0961490 A2 | 12/1999 |
| EP | 0966164 A2 | 12/1999 |
| EP | 0992 922 A2 | 4/2000 |
| EP | 1049305 A1 | 11/2000 |
| EP | 1133088 A1 | 9/2001 |
| EP | 1143728 A2 | 10/2001 |
| EP | 1444825 A2 | 8/2004 |
| GB | 235095 A | 6/1925 |
| GB | 2168227 A | 6/1986 |
| GB | 2177873 A | 1/1987 |
| GB | 2255214 A | 10/1992 |
| GB | 2259830 A | 3/1993 |
| GB | 2269302 A | 2/1994 |
| GB | 2330429 A | 4/1999 |
| GB | 2343095 A | 4/2000 |
| GB | 2344009 A | 5/2000 |
| GB | 2353095 A | 2/2001 |
| GB | 2358938 A | 8/2001 |
| JP | 60143086 A | 7/1985 |
| JP | 61-202587 A | 9/1986 |
| JP | 01-020454 A | 1/1989 |
| JP | 1130683 A | 5/1989 |
| JP | 1142918 A | 6/1989 |
| JP | 3029456 A | 2/1991 |
| JP | 3114375 A | 5/1991 |
| JP | 3198119 A | 8/1991 |
| JP | 4233886 A | 8/1992 |
| JP | 5250106 A | 9/1993 |
| JP | 6-134489 A | 5/1994 |
| JP | 6224777 A | 8/1994 |
| JP | 7-235909 A | 9/1995 |
| JP | 09227193 A | 9/1997 |
| JP | 9-284571 A | 10/1997 |
| JP | 2000-013779 A | 1/2000 |
| JP | 2001-119681 A | 4/2001 |
| WO | 8000209 A1 | 2/1980 |
| WO | 8801463 A1 | 2/1988 |
| WO | 8909528 A1 | 10/1989 |
| WO | 8912370 A1 | 12/1989 |
| WO | 9010988 A1 | 9/1990 |
| WO | 91/00670 A1 | 1/1991 |
| WO | 9103112 A1 | 3/1991 |
| WO | 9204801 A1 | 3/1992 |
| WO | 9210040 A1 | 6/1992 |
| WO | 9211713 A1 | 7/1992 |
| WO | 9212599 A1 | 7/1992 |
| WO | 92/17027 A1 | 10/1992 |
| WO | 9221206 A1 | 11/1992 |
| WO | 9311637 A1 | 6/1993 |
| WO | 9322877 A2 | 11/1993 |
| WO | 9407327 A1 | 3/1994 |
| WO | 9413107 A1 | 6/1994 |
| WO | 9414282 A1 | 6/1994 |
| WO | 94/16527 A1 | 7/1994 |
| WO | 94/30008 A1 | 12/1994 |
| WO | 9515658 A1 | 6/1995 |
| WO | 96/08109 A1 | 3/1996 |
| WO | 9617306 A2 | 6/1996 |
| WO | 9625006 A1 | 8/1996 |
| WO | 9641473 A1 | 12/1996 |
| WO | 97/12486 A1 | 4/1997 |
| WO | 9713368 A1 | 4/1997 |
| WO | 9720274 A1 | 6/1997 |
| WO | 9722110 A1 | 6/1997 |
| WO | 9722112 A1 | 6/1997 |
| WO | 9741688 A1 | 11/1997 |
| WO | 9746007 A1 | 12/1997 |
| WO | 9802836 A2 | 1/1998 |
| WO | 9808344 A2 | 2/1998 |
| WO | 9810997 A1 | 3/1998 |
| WO | 9818086 A1 | 4/1998 |
| WO | 9828906 A2 | 7/1998 |
| WO | 9848566 A2 | 10/1998 |
| WO | 9853581 A1 | 11/1998 |
| WO | 9853611 A1 | 11/1998 |
| WO | 99/14947 A1 | 3/1999 |
| WO | 99/17549 A1 | 4/1999 |
| WO | 9918701 A1 | 4/1999 |
| WO | 99/26415 A1 | 5/1999 |
| WO | 9945491 A1 | 9/1999 |
| WO | 99/52285 A1 | 10/1999 |
| WO | 99/66719 A1 | 12/1999 |
| WO | 00/08855 A1 | 2/2000 |
| WO | 0005890 A1 | 2/2000 |
| WO | 0005892 A1 | 2/2000 |
| WO | 00/27122 A1 | 5/2000 |
| WO | 00/28733 A1 | 5/2000 |
| WO | 0064164 A1 | 10/2000 |
| WO | 0064169 A1 | 10/2000 |
| WO | 00/79794 A2 | 12/2000 |
| WO | 0101689 | 1/2001 |
| WO | 0111874 A1 | 2/2001 |
| WO | 0118665 A1 | 3/2001 |
| WO | 0124083 A2 | 4/2001 |
| WO | 0167207 A2 | 9/2001 |
| WO | 0167763 A1 | 9/2001 |
| WO | 0175649 A2 | 10/2001 |
| WO | 01/99426 A2 | 12/2001 |

OTHER PUBLICATIONS

U.S. Appl. No. 13/336,399, filed Dec. 23, 2011, Method and Apparatus for Targeting of Interactive Virtual Objects.
U.S. Appl. No. 09/973,081, filed Oct. 10, 2001, Video and digital multimedia acquisition and delivery system and method.
U.S. Appl. No. 09/920,723, filed Aug. 3, 2001, Video and Digital Multimedia Aggregator.
U.S. Appl. No. 09/977,488, filed Oct. 16, 2001, Video and Digital Multimedia Aggregator Content Availability Notification System and Method.
U.S. Appl. No. 09/973,067, filed Oct. 10, 2001, Video and Digital Multimedia Aggregator Content Coding and Formatting.
U.S. Appl. No. 09/920,615, filed Aug. 3, 2001, Video and Digital Multimedia Aggregator Remote Content Crawler.
U.S. Appl. No. 09/921,057, filed Aug. 3, 2001, Video and digital multimedia aggregator content suggestion engine.
U.S. Appl. No. 12/856,830, filed Aug. 16, 2010, Video and Digital Multimedia Aggregator.
U.S. Appl. No. 12/971,033, filed Dec. 17, 2011, Video and Digital Multimedia Aggregator Content Coding and Formatting.
U.S. Appl. No. 13/544,423, filed Jul. 9, 2012, Video and Digital Multimedia Aggregator.
U.S. Appl. No. 13/606,670, filed Sep. 7, 2012, Video and Digital Multimedia Aggregator Remote Content Crawler.
U.S. Appl. No. 14/093,087, filed Dec. 2, 2013, Video and Digital Multimedia Aggregator.
Canadian Office Action—CA Appl. 2,462,161—dated Jul. 16, 2015.
Response to Canadian Office Action—CA Application 2,462,161—dated May 26, 2015.
Office Action in Canadian Patent Application No. 2,414,717, dated May 7, 2010.
Brin, Sergey et al., "The Anatomy of a Large Scale Hypertextual Web Search Engine", Aug. 3, 2001, pp. 1-19.

(56) References Cited

OTHER PUBLICATIONS

Chadwick, Henry, et al., "DAVIC—Digital Audio-Visual Council", TV Anytime and TV anywhere, Dec. 1999, pp. 1-140.
European Office Action dated Jan. 30, 2012 in EP Application No. 02778473.5.
International Preliminary Examination Report in PCT Application No. PCT/US02/32756, dated Feb. 17, 2005.
Notice of Reasons for Rejection dated Jan. 31, 2012 in Japanese Application No. P2009-188618 and English translation hereof.
Office Action in Canadian Patent Application No. 2462159, dated Aug. 2, 2010.
Office Action in Canadian Patent Application No. 2462161, dated Feb. 1, 2011.
Office Action in EP Application No. 02778472.7, dated Feb. 15, 2010.
Office Action in EP Application No. 02784096.6, dated Mar. 26, 2010.
Office Action in JP Application No. P2003-535456, dated Mar. 17, 2009, with translation.
Office Action in JP Application No. P2003-537297, dated Mar. 17, 2009, with translation.
Office Action in JP Application No. P2003-537297, dated Nov. 24, 2009, with translation.
Supplementary EP Search Report in EP Application No. 02 80 0962 dated Jul. 26, 2010.
Supplementary EP Search Report in EP Application No. 02778472, dated Oct. 7, 2005.
Supplementary EP Search Report in EP Application No. 02784096, dated Oct. 13, 2005.
Supplementary Partial EP Search Report in EP Application No. 02778473, dated Oct. 25, 2005.
Written Opinion in PCT Application No. PCT/US02/32756, dated Aug. 13, 2004.
Supplementary European Search Report for EP 02800962 dated Jul. 26, 2010.
Koenen, et al., "MPEG-4: Context and Objectives", Signal Processing Image Communication 9 (1997), pp. 295-304.
Examiner's Report for Canadian Application No. 2,462,160 dated Jan. 20, 2009.
Pereira, et al., "MGEG-4-0pening New Frontiers to Broadcast Services", EBU Technical Review, Spring 1999, pp. 28-35.
European Search Report for EP 02776187.3 dated Apr. 11, 2005.
Office Action in Canadian Patent Application No. 2680673, dated Oct. 7, 2010.
Office Action in Canadian patent application No. 2680673, dated May 24, 2011.
Office Action in European Patent Application No. 07007019.8, dated Oct. 21, 2011.
Rule 69 EPC Communication in European Patent Application No. 07016891.9, dated Aug. 9, 2010.
Search Report and Written Opinion in European Patent Application No. 07016891.9-2202, dated Jul. 5, 2010.
Search Report in European Patent Application No. 07007019.8, dated Feb. 11, 2011.
Freier, Alan 0. et al., "The SSL Protocol Version 3.0," Mar. 1996, pp. 1-52, Netscape.
Kaliski. Burton S .. "A Layman's Guide to a Subset of ASN.1, BER and DER," Nov. 1, 1993, pp. 1-38, RSA Laboratories.
Malpani, Am Barish et al., "Simple Certificate Validation Protocol (SCVP)," Jul. 2001, pp. 1-23.
PKCS #7: Cryptographic Message Syntax Standard, Nov. 1993, pp. 1-29, RSA Laboratories.
Office Action in European Application No. 07016891.9-2202, dated Apr. 21, 2010.
Extended European Search Report—EP 11007278.2—dated Jan. 8, 2014.
Nov. 18, 2016—European Office Action—EP 02776187.3.
Jul. 13, 2017—European Summons to Oral Proceedings—EP App. 02778472.7.
Jul. 12, 2017—European Office Action—EP 02778473.5.
European Office Action—EP. App 06004531.7—dated Oct. 10, 2016.
Pereira F Et al.: "MPEG-4-Opening New Frontiers to Broadcast Services", EBU Review—Technical, European Broadcasting Union. Brussels, BE, No. 279, Mar. 21, 1999 (Mar. 21, 1999), pp. 28-35, XP000848408, ISSN: 0251-0936.
Oct. 16, 2017—European Office Action—EP 02776187.3.
Jan. 3, 2018—European Final Rejection—EP 02778472.7.
Jan. 4, 2019—EP Summons to Oral Proceedings—EP11007278.2.

\* cited by examiner

VIDEO AND DIGITAL MULTIMEDIA AGGREGATOR CONTENT CODING AND FORMATTING

RELATED APPLICATIONS

This application is a continuation of patent application Ser. No. 12/971,033, filed on Dec. 17, 2010, which is a continuation of patent application Ser. No. 09/973,067, filed on Oct. 10, 2001, which is a continuation-in-part of patent application Ser. No. 09/920,723, filed on Aug. 3, 2001 and a continuation-in-part of patent application Ser. No. 09/920,615, filed on Aug. 3, 2001. These patent applications are hereby incorporated by reference.

The following U.S. patents also are incorporated by reference:

U.S. Pat. No. 5,798,785, entitled "Terminal for Suggesting Programs Offered on a Television Program Delivery System;"

U.S. Pat. No. 5,986,690, entitled "Electronic Book Selection and Delivery System;"

The following co-pending U.S. patent applications also are incorporated by reference:

patent application Ser. No. 07/991,074, filed Dec. 9, 1992, entitled "Remote Control for Menu Driven Subscriber Access to Television Programming;"

patent application Ser. No. 08/906,469, filed Aug. 5, 1997, entitled "Reprogrammable Terminal for Suggesting Programs Offered on a Television Program Delivery System;"

patent application Ser. No. 09/191,520, filed Nov. 13, 1998, entitled "Digital Broadcast Program Ordering;"

patent application Ser. No. 09/289,957, filed Apr. 13, 1999, entitled "Electronic Book Alternative Delivery Systems;"

patent application Ser. No. 09/289,956, filed Apr. 13, 1999, entitled "Electronic Book Alternative Delivery Methods;" and patent application entitled "Video and Digital Multimedia Aggregator;" and patent application entitled "Video and Digital Multimedia Aggregator Remote Content Crawler," filed on date herein.

TECHNICAL FIELD

The technical field is television program and digital multimedia delivery systems that incorporate intelligent and flexible program search and delivery mechanisms.

BACKGROUND

Cable television delivery systems greatly expanded the array of programs available to television viewers over that provided by over-the-air broadcast systems. Subsequently, satellite television delivery systems, and in particular, digital satellite broadcast systems further expanded the viewing choices for consumers. In the near future, digital broadcast television systems will provide many more programming choices for consumers.

In addition to television programming delivered through television program delivery systems, other programs and events may be sent to consumers. These other programs and events include streaming video sent over wired and unwired, narrowband to broadband services, digital audio programs, and other multimedia data.

Unfortunately, customers are still limited in their television viewing choices by the local and regional nature of television delivery systems. For example, a broadcaster in Boston may provide programming of local interests to people in Massachusetts while a broadcaster in Seattle may provide different programming to people in the Seattle area. A person in Boston generally cannot access Seattle programming, other than programming that is provided at a national level.

In addition to this local/regional market segregation, many other sources of programming and events may not be available in a specific viewing area. These other sources may include audio programming, streaming video, local or closed circuit television programming (e.g., education television programming provided by a state education department) and other programming.

Even if certain programming is available in a local viewing area, a viewer may not be aware of its existence. This situation may be the result of a large array of available programming coupled with a limited program menu or guide. The program guide may be limited in that not all available programming can be listed, some programming changes occur that are not reflected in the program guide, and errors may exist in the program guide. In addition, the more comprehensive the program guide, the harder it is for the viewer to search and navigate the program guide to find a desired program.

SUMMARY

The problems noted above are solved by the video and digital multimedia aggregator system and method described herein. Program content can be packaged and delivered by the system, including video, television, radio, audio, multimedia, computer software, and electronic books, or any content that can be delivered in digital format.

The aggregator comprises a request and results processing server, a search engine server coupled to the request and results processing server and a content acquisition server coupled to the request and results processing server. The request and results processing server receives a request for a program, the search engine server searches for the program and the content acquisition server acquires a program for delivery to the user. The request and results processing server includes a search request processor that receives information related to the user's search request and provides the information to a search results form builder that creates an electronic search request. The search request may be augmented by using a content search suggestion engine to add additional search terms and descriptions to the search request. The aggregator may also include a decoder that decodes program content and program metadata from remote sources for storage at the aggregator, and an encoder that encodes content metadata and programs for delivery to the user. The aggregator may also comprise one or more crawlers, such as a content crawler, to look for program content in the digital communications network.

The search engine server searches at least a local content database. The local database comprises at least two file types. A content file includes a complete program content file. For example, the 1997 movie Titanic may exist in the local content database as a complete program content file. The complete program content file may also include a reference content or metadata that contains additional information related to the content. Such additional information in the reference content may include: a program description, including program rating, program description, video clips, program length, format (e.g., 4×3 television or 16×9 movies), and other information; billing information and digital rights management information; viewing statistics, including number of times viewed, dates/times viewed, identity of users viewing the program; advertisement information to allow ads to be inserted during viewing of the program; and other information.

The additional information in the reference file may be provided in whole or in part to the system users. For example, the aggregator may provide a program description and accompanying video clips to selected systems users. The reference file may also be used by the aggregator for system administration purposes. For example, billing and digital rights management information may be used to collect appropriate fees from system users and to provide such collected fees to the entities owning rights in the content.

A remote content crawler continually crawls the digital communication network looking for content to provide to the aggregator. The content provided to the aggregator may be stored in a form of an entire content file. For example, the content may include an entire movie, television program or electronic book. Alternatively, the content provided to the aggregator may be a reference to a content file that is stored at, or that will be available at one of the remote locations. For example, the content may be a reference to a future, scheduled live sports event that will be made available to system users. The sports event may be provided for a one time fee, as part of a sports package, for which a fee is collected, or as a free event. In the examples discussed above, the content may be stored at the aggregator, and may subsequently be provided to system users. For the example of the live sports event, the aggregator may store the live sports event and may then provide the sports event as a replay, in addition to facilitating live viewing of the sports event.

To ensure the content is delivered to the correct addressee, in a format that is compatible with the addressee's equipment (i.e., hardware and software), the aggregator may include one or more content coders, decoders and formatters. In an embodiment, the coding, decoding and formatting functions may be executed by separate components, which may be embodied as hardware or software, or a combination of hardware and software. In another embodiment, two or more of the functions may be executed by a single device, comprising hardware and/or software.

In an embodiment, the formatting, decoding and coding functions are executed by a coder-decoder (codec) formatter. The codec formatter may comprise means for receiving a coding and formatting request, means for analyzing parameters contained in the coding and formatting request, means for decoding, formatting and coding target content, means for configuring the decoding, formatting and coding means, and means for routing coded target output content to one or more target addresses.

In another embodiment, the codec formatter may include means for processing auxiliary service requests. Such auxiliary service requests may be included in the coding and formatting request, or may be separately supplied. The auxiliary services may include closed captioning, descriptive video narration, alternative language audio, content rating, critical review information, device control and commands, future content schedules, advertising, targeted advertising, text and data services, interactive services, and content metadata. The means for processing auxiliary services includes means for analyzing the auxiliary service requests, means for configuring one or more auxiliary services processing means to supply the requested auxiliary services, and means for outputting the requested auxiliary services. The outputted auxiliary services may be combined with the coded target output content.

DESCRIPTION OF THE DRAWINGS

The detailed description will refer to the following drawings in which like numerals refer to like elements, and in which.

DETAILED DESCRIPTION

Figure 1:
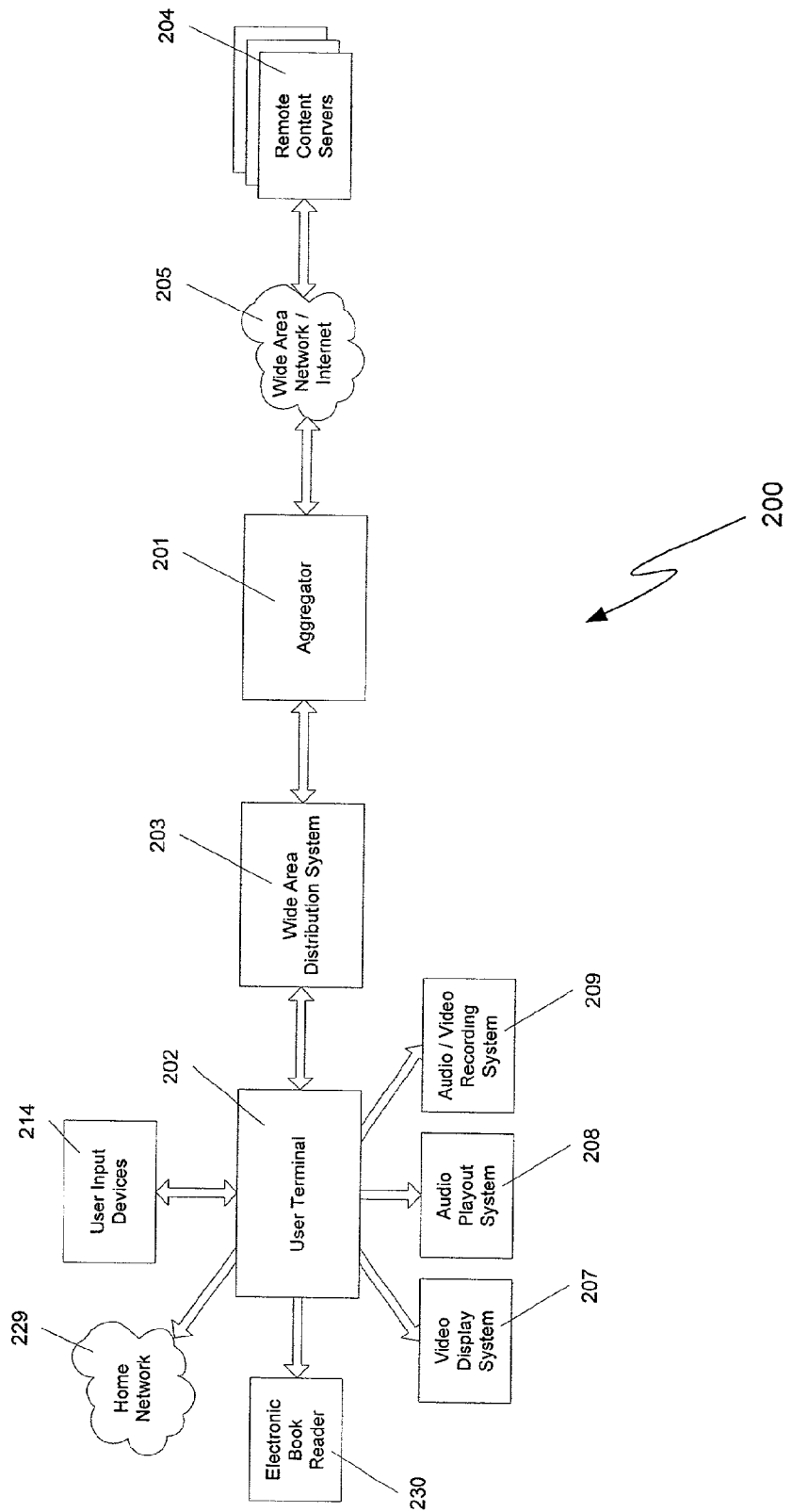
FIG. 1 is a block diagram of primary components of a content search, packaging, and delivery system.

FIG. 1 is a block diagram of a content search, packaging, and delivery system 200. The content to be packaged and delivered by the system 200 includes video, television, radio, audio, multimedia, computer software and electronic books. Components of the system 200 include an aggregator 201 and a user terminal 202, which are connected using a wide area distribution system 203. Other components are remote content servers 204 that exchange data with the aggregator 201 using a wide area network/Internet 205 connection. The user terminal 202 may incorporate a video display system 207, an audio playout system 208, an audio/video recording system 209, user input devices 214, an electronic book reader 230, and a connection to a home network 229 to interact with other devices in the user's home environment. Alternatively, one or more or all of the video display system 207, the audio playout system 208, the audio/video recording system 209, and the electronic book reader 230 may be separate components that are coupled to the user terminal 202.

Figure 4:
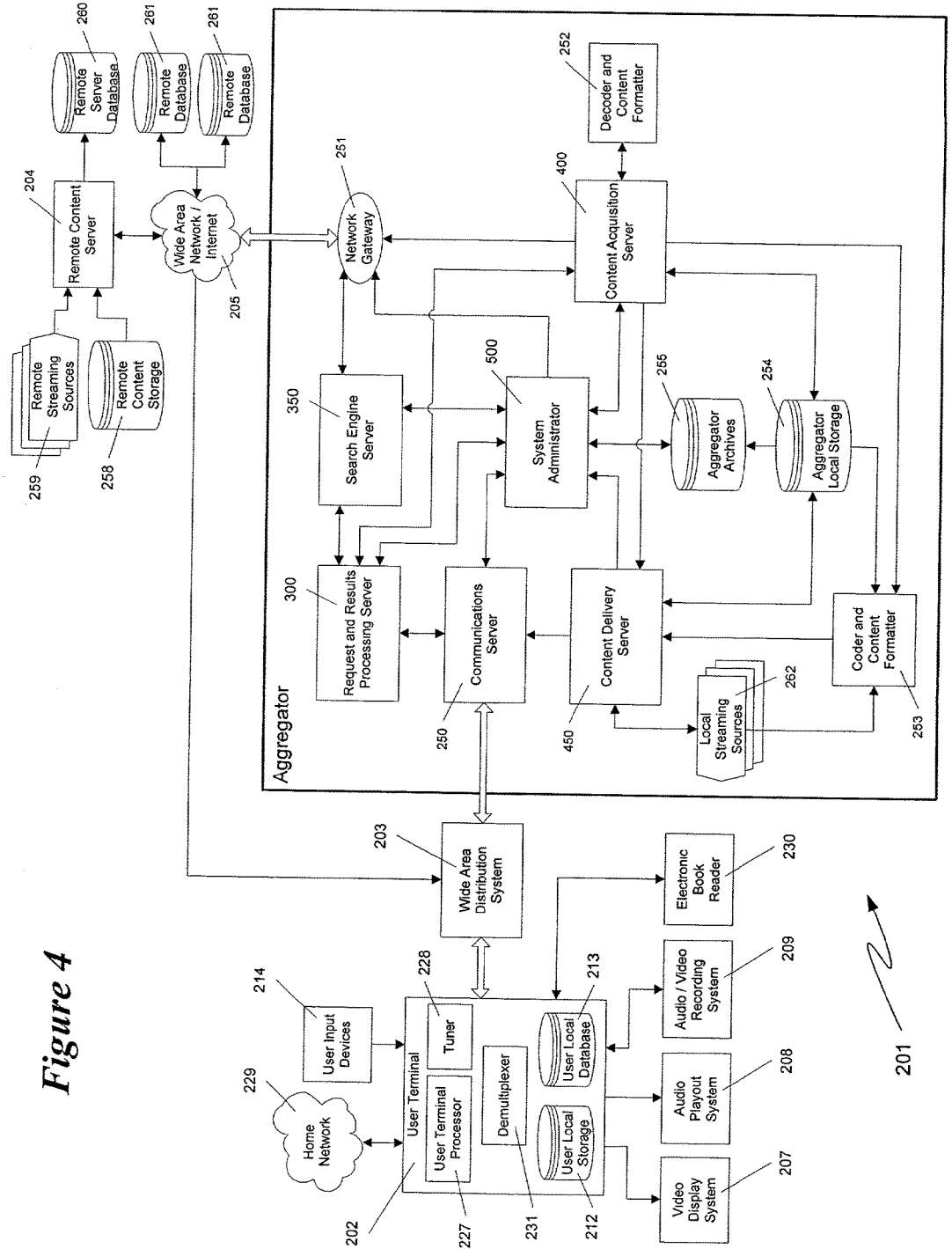
FIG. 4 is a schematic of the components of the content search, packaging, and delivery system showing subsystems of an aggregator, a user terminal, and a remote content server.

The system 200 allows a user to enter search parameters, such as keywords and category headings, and have the aggregator 201 use these parameters to locate, package, and deliver content to the user terminal 202 from numerous sources. The requests and content deliveries can be sent over communications links including, but not limited to, telephone lines, coaxial cable, fiber-optic cable, wireless connections, wide area networks, the Internet, and other communication media collectively represented by the wide area distribution system 203. The numerous sources of content are shown in FIG. 4 and include, but are not limited to, an aggregator local storage 254, local streaming sources 262, remote content storage 258, and remote streaming sources 259. In an embodiment, the local streaming sources 262 are comprised of the audio and video channels being delivered using a cable headend system that may house the aggregator 201.

The system 200 will take a user's search request and may perform a search of virtually every active and scheduled radio and television channel in the world, as well as archived sources of video and audio programming such as movies and recorded audio sources and sources of other multimedia, software, and electronic book content. In an embodiment, the system 200 will also search Internet Web sites and other online databases. The user will then be able to select programming or other content for download based on the search results. In an embodiment, the download, or delivery, process can be fulfilled by making the content available on a specific channel of a cable television system, or by transmitting the content using a digital communications protocol, such as the Internet standard TCP/IP, for example. In addition, the content search, packaging, and delivery system 200 is capable of formulating and presenting a list of suggested content based on an analysis of the user's current search parameters, stored information about previous searches and previously selected content downloads and other user-specific or related information. The system 200 is also capable of notifying a user prior to the start time of selected programming and availability of other content using such notification as an electronic mail message and/or an on-screen message indicating that the scheduled program will be broadcast at a specified time. The system 200 may support one or more digital rights management (DRM) systems to track the usage and copyrights rights associated with downloaded content and bill the user's account as appropriate and provide any license and usage fees to the content provider. The system 200 may implement a users' privacy protection scheme allowing users to control what information is gathered, limit what is done with that information, and review and delete the user's profile if desired.

Figure 2:
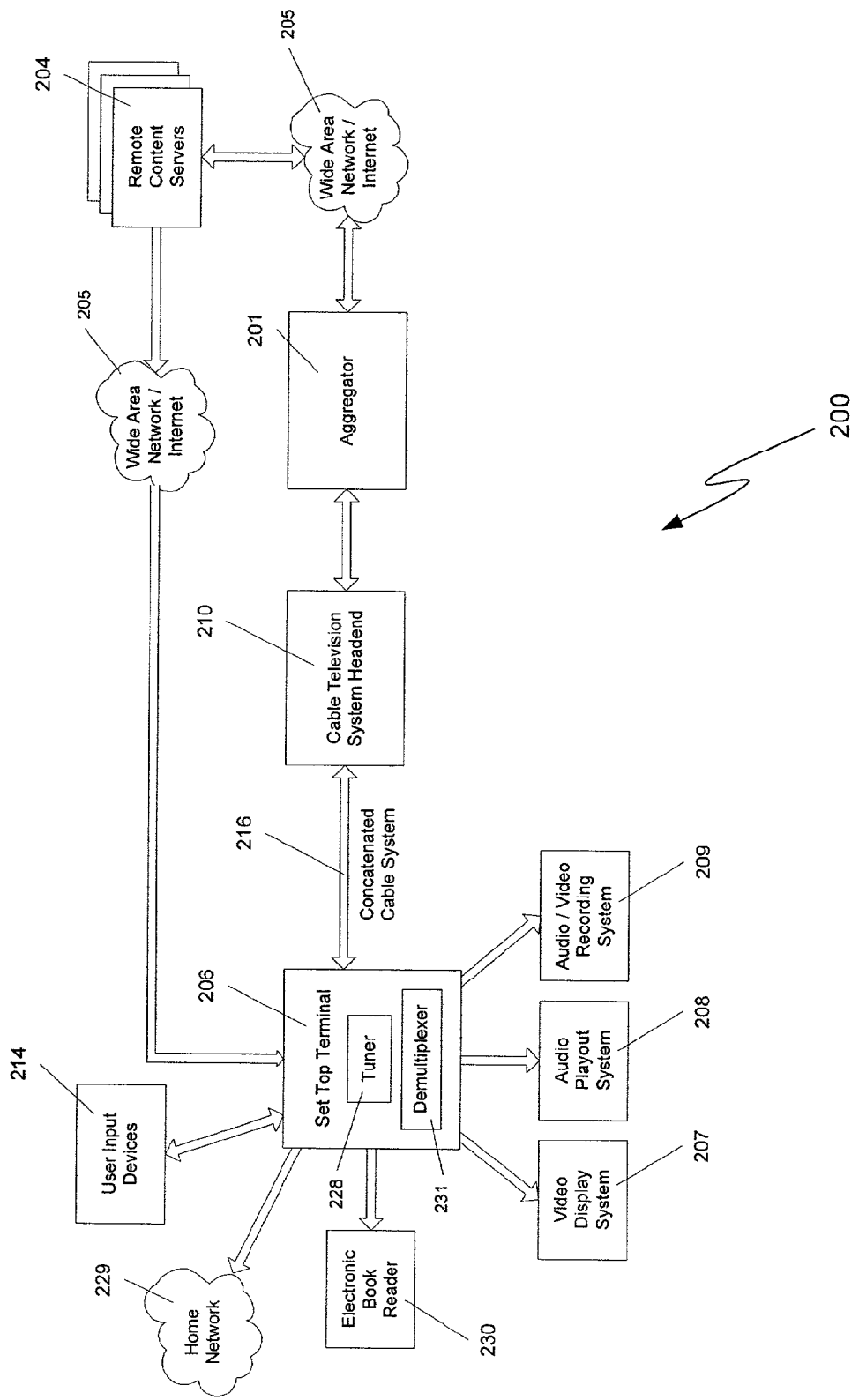
FIG. 2 is a block diagram of the components of the content search, packaging, and delivery system configured to deliver content to a set top terminal.

An overview of an embodiment of the system 200 is shown in FIG. 2 where the user terminal 202 is a set top terminal 206 that communicates with the aggregator 201 through a cable television system headend 210, thereby making use of the cable television system headend 210 high bandwidth concatenated cable system 216. Further, the set top terminal 206 system may include a tuner 228, a demultiplexer 231, the video display system 207, the audio playout system 208, the audio/video recording system 209, user input devices 214, an electronic book reader 230, and a connection to the user's home network 229. These components are used to tune, select, view, listen to, and store audio and video programming and other content delivered by the search, packaging, and delivery system 200. FIG. 2 also shows a communications path from one or more remote content servers 204 through the wide area network/Internet 205 directly to the set top terminal 206, which bypasses the aggregator 201 and cable television system headend 210. This path may be used in the case where the requested content is available in the required format from the remote content server 204 and is authorized for direct delivery to the user. In an alternative embodiment, the aggregator 201 is collocated with the cable television system headend 210 that is acting as the wide area distribution system 203 as is the case when a cable television system is also serving as the user's Internet service provider.

Figure 3:
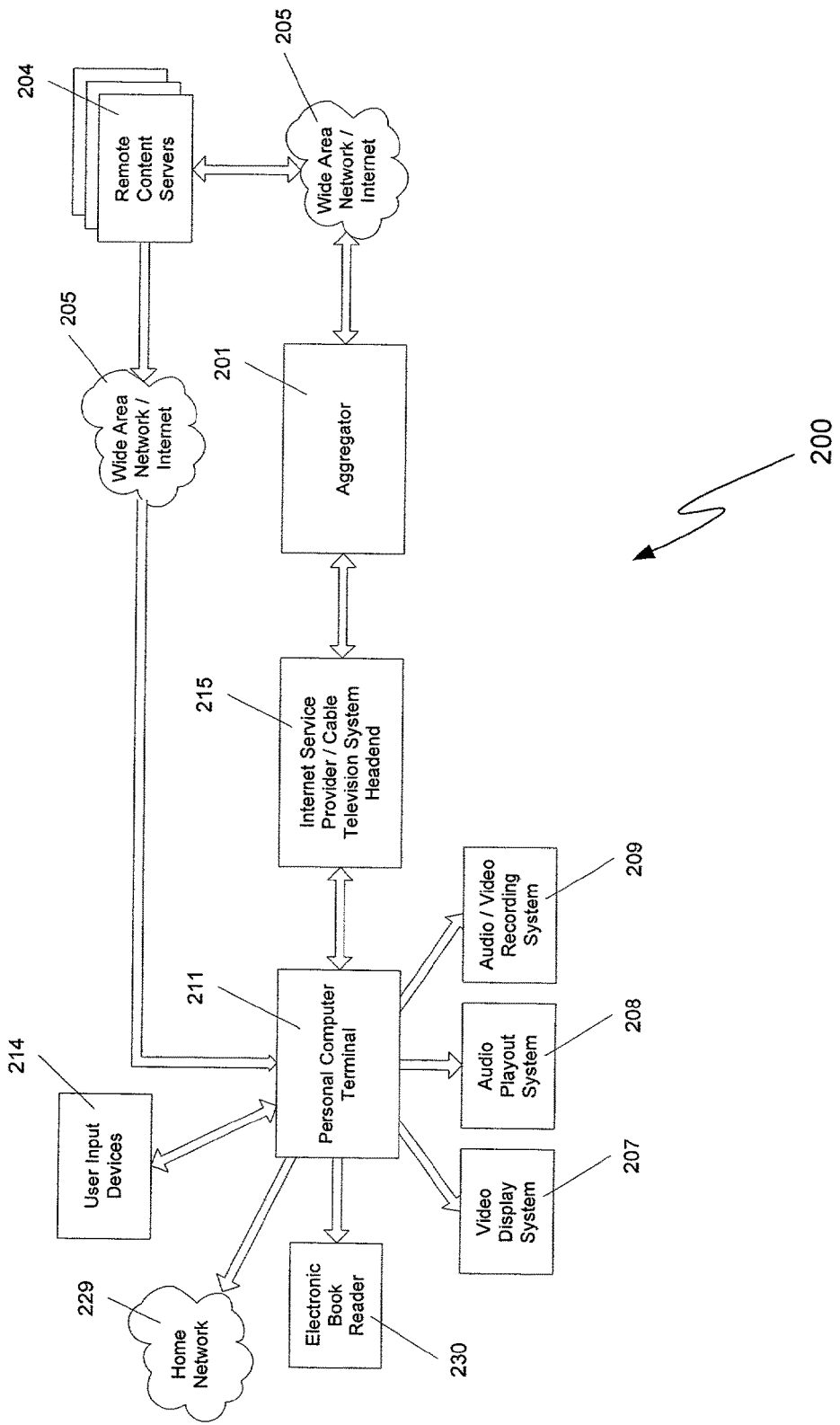
FIG. 3 is a block diagram of the components of the content search, packaging, and delivery system configured to deliver content to a personal computer terminal.

An overview of another embodiment of the system 200 is shown in FIG. 3, where the user terminal 202 is a personal computer terminal 211 that communicates with the aggregator 201 through an Internet service provider/cable television system headend 215. In this case, the content may be delivered by a cable headend that is operating as an Internet service provider (ISP). The personal computer terminal 211 also may include the video display system 207, the audio playout system 208, the audio/video recording system 209, user input devices 214, the electronic book reader 230, and the connection to the home network 229. A communications path also exists from one or more remote content servers 204 through the wide area network/Internet 205 directly to the personal computer terminal 211, which bypasses the aggregator 201 and the Internet service provider/cable television system headend 215 in the case where requested content is in the required format and is authorized for direct delivery to the user.

The user can receive video and audio programs (i.e., the content) in a number of different ways. First, the tuner 228 in the user terminal 202, shown in FIG. 2, can simply tune to the desired program, or the demultiplexer 231 can select a program from a digital multiplex, thereby displaying the program at the appropriate time. However, the desired program may not be broadcast by the user's cable television system headend 210, or the user would like to watch a program supplied by the local headend, but not subscribed to by the user, e.g., a boxing match broadcast by a premium channel that the user does not ordinarily receive. In these examples, the program can be delivered to the user by the aggregator 201 using the telephone lines, fiber-optic transmission lines, or other communication media, or using the cable television system headend 210. In an embodiment, the aggregator 201 can supply the desired program to the user by pulling programs from program delivery systems in the United States and abroad and delivering the program to system users. Therefore, a user can have access to programs outside the user's immediate viewing area.

FIG. 4 shows the system 200 and system components in more detail. At a user's location, the user terminal 202 includes the tuner 228, the demultiplexer 231, a user terminal processor 227, user local storage 212 and user local database 213. Coupled to the user terminal 202 may be user input devices 214, the video display system 207, the audio playout system 208, the audio/video recording system 209, an electronic book reader 230, and a connection to the home network 229.

The user terminal 202 is coupled through the wide area distribution system 203 to the aggregator 201 and further through the wide area network/Internet 205 to remote program sources. The remote program sources include remote streaming sources 259 and remote central storage 258. The remote program sources also include remote databases 261 and, through the remote content server 204, a remote server database 260.

The aggregator 201 may include a communications server 250 that communicates with the user terminal 202 through the wide area distribution system 203. The communications server 250 receives inputs from a request and results processing server 300, a content delivery server 450 and a system administrator 500. The content delivery server 450 receives inputs from a coder and content formatter 253 and a content acquisition server 400. The content delivery server 450 also accesses an aggregator local storage 254 and local streaming sources 262. Finally, the content delivery server 450 provides an output to the system administrator 500.

The coder and coder formatter 253 receives inputs from the content acquisition server 400, the aggregator local storage 254 and local streaming sources 262. The system administrator 500 receives inputs from the content and delivery server 450, and communicates with the content acquisition server 400, the request and results processing server 300, a search engine server 350 and aggregator archives 255. A decoder and content formatter 252 is coupled to the content acquisition server 400. Finally, a network gateway 251 couples components of the aggregator 201 with the remote content server 204 through the wide area network/Internet 205.

Programs received at the aggregator 201 may be input to the formatter 253. The formatter 253 reformats all input content into a format that is readily received by all user terminals 202 operably connected to the delivery system 200 (not shown in FIG. 4). In addition, the formatter 253 can store full or partial copies of content in compressed form in the aggregator local storage 254. Furthermore, the aggregator 201 can provide real-time delivery of certain content, such as a boxing match. In an embodiment, if a large number of users want a particular live program, then the cable television system headend 210 can broadcast the program on a particular channel available to all the requestors instead of broadcasting the program to each individual user over the wide area distribution system 203. See U.S. patent application Ser. No. 09/191,520, entitled Digital Broadcast Program Ordering, hereby incorporated by reference, for additional details of broadcast program delivery.

The aggregator 201 can also implement a screening process for limiting the number of programs captured to those programs with a viewing audience above a predetermined threshold. In effect, the aggregator 201 contains a filter that will pass only programs meeting the predetermined selection criteria. The filter may include programming that screens the content to reject specific items, such as adult content, for example.

The system administrator 500 records what fees should be paid and to whom. For example, the aggregator 201 will determine to whom any copyright or other fees should be paid when a program is broadcast.

The user terminal 202 may be a television, a set top terminal 206, a personal computer terminal 211 (not shown), or any device capable of receiving digital or analog data, or some combination thereof. The user terminal 202 is equipped with the user input devices 214 that communicate search criteria to the system 200 as well as navigate through the user terminal menu system and control the user terminal's other various functions. The user local storage 212 is used to store and archive content onto one or more removable and/or non-removable storage devices or media for later access. Removable storage media may include, but is not limited to, magnetic tape, magnetic disks, optical disks and modules, and electronic memory cartridges. The user local database 213 is the repository of all relevant information about a user's profile and account. This information includes, but is not limited to, user name, password, personal information that the user has authorized for storage, billing information, other users allowed access to the account, past search criteria, past content download information, and library information about stored content. As a consumer protection, the user terminal 202 may enable the account user to view the information stored in the user local database 213 and modify certain data fields and select which data fields may be reported to a main system database within the aggregator 201. Certain fields including, but not limited to, account numbers and billing information may not be allowed this level of user access.

The user terminal processor 227 may include a central processing unit and all associated hardware, software, and firmware modules to perform all operations within the user terminal 202. These operations include, but are not limited to, managing communications with the aggregator 201 and other networked devices, processing search and download requests, displaying search and download results, managing and controlling communications with the user local storage 212 and the user local database 213, responding to user interaction with presentation of graphical user interface (GUI) menus, playing out selected programming content using various audio and video output devices, implementing the user's part of the digital rights management schema, and administering the user's account and billing. The tuner 228 and the demultiplexer 231 are used to select an audio/video channel for playout from the channels available on the cable television system 216.

In an embodiment, the user terminal 202 may incorporate selected features of the aggregator 201. For example, the user terminal 202 may include a small metadata crawler, an aggregator, and program content and program metadata storage.

The user terminal 202 communicates with the aggregator 201 using the wide area distribution system 203. Within the aggregator 201, the communications server 250 acts as the interface point to the wide area distribution system 203 for the purpose of managing primary communications to system users. The communications server 250 routes incoming user requests and associated user information to the request and results processing server 300, routes search results and content downloads through the wide area distribution system 203 to end users, and may route billing information from a customer billing server to the end users. The request and results processing server 300 performs the basic processing and routing related to user search requests, content download requests, administrative information requests, search results, related content suggestions, and programming notification.

Figure 5:
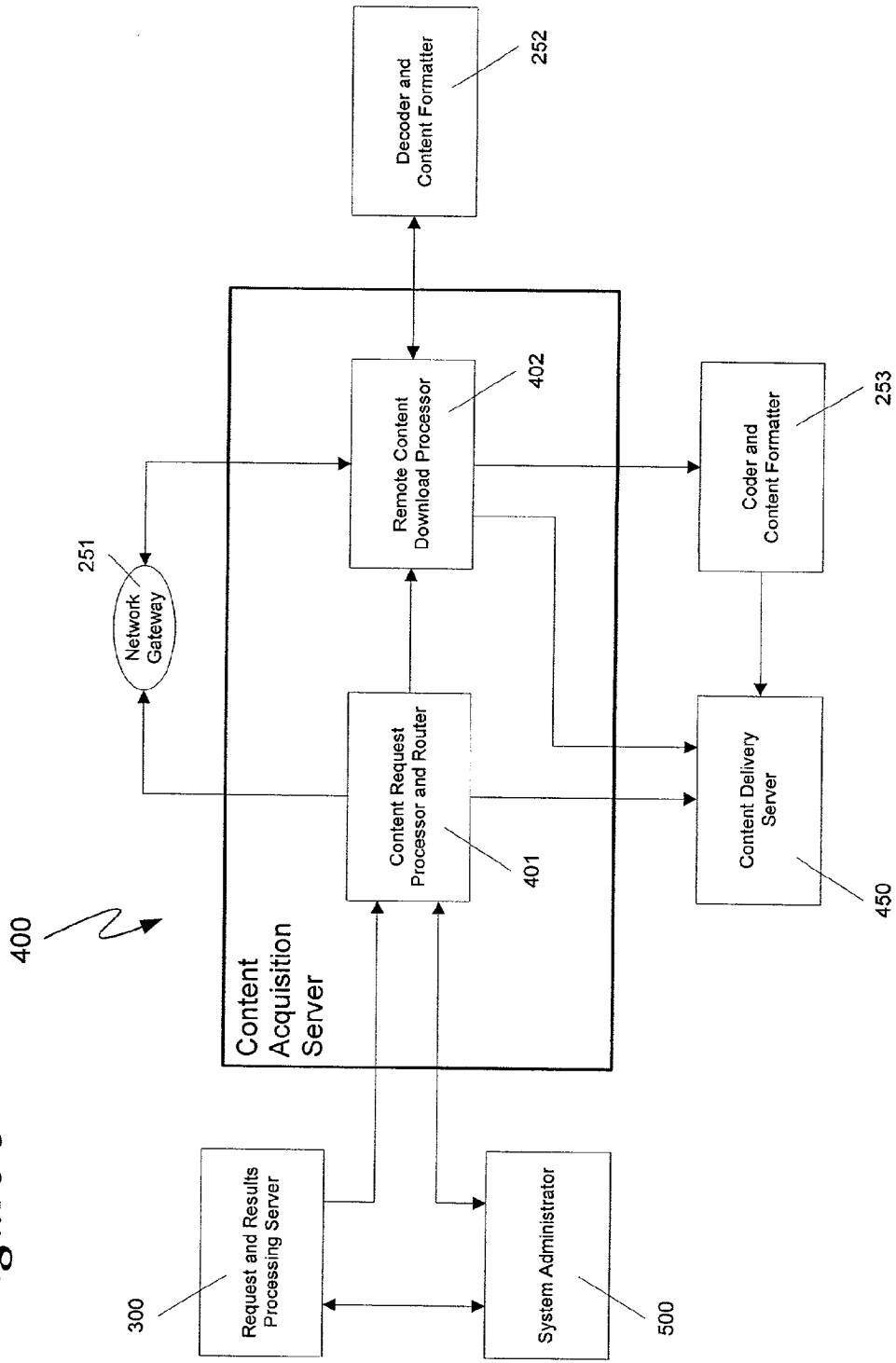
FIG. 5 is a schematic of subsystems of a content acquisition server and components with which the content acquisition server interacts as part of a content search, packaging, and delivery system.

The content acquisition server 400, as shown in detail in FIG. 5 receives content download requests from the request and results processing server 300. The content acquisition server 400 includes a content request processor and router 401 and a remote content download processor 402. A download request is made by the user for content selections from sources including, but not limited to, earlier programming searches, recurring scheduled events, an electronic program guide, lists of electronic books and computer software, advertisements, promotions, and affiliated Internet websites. In general, a download request will be accompanied by data indicating the source of the content and whether the content is local or remote. Requests for content that is available only from a remote site may be routed to the network gateway 251 and then to the appropriate remote source. Remote sources include, but are not limited to, the remote content storage 258 and the remote streaming sources 259 shown in FIG. 4. The remote content server 204 verifies the request and returns the content through the wide area network/Internet 205. If the programming content is in the appropriate format and is authorized for direct delivery to the user, the content may be routed through the wide area network/Internet 205 and the wide area distribution system 203 directly to the user terminal 202. During this transfer, administrative data pertaining to billing and verification of delivery may be sent back to the aggregator 201.

Figure 6:
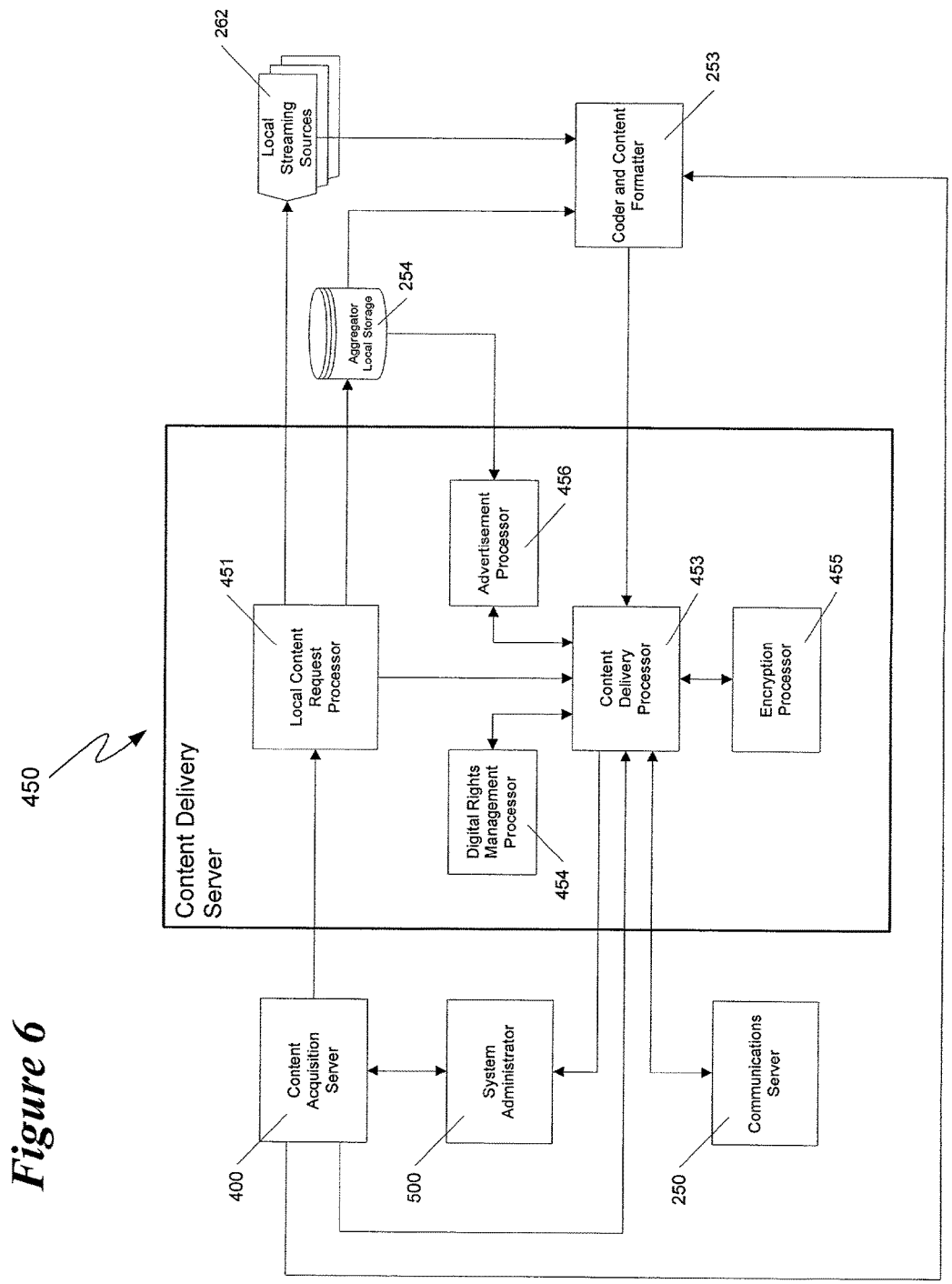
FIG. 6 is a schematic of subsystems of a content delivery server and components with which the content delivery server interacts as part of the content search, packaging, and delivery system.

Programming that is not formatted and authorized for direct delivery from a remote source may be transmitted through the network gateway 251 to the remote content download processor 402 contained within the content acquisition server 400. The remote content download processor 402 buffers or caches the programming content while managing the download connection to the remote source. The programming content is then routed to the decoder and content formatter 252, which may be capable of decoding various industry formats and compression schemes and may reformat and encode the decoded data and associated metadata into one or more preferred content formats for delivery and for local storage. The processed programming content, along with user identification and routing data, is then routed to the content delivery server 450, which then manages the delivery of the content through the communications server 250 and wide area distribution system 203 to the user terminal 202. The content delivery server 450 is shown in detail in FIG. 6. The content acquisition server 400 is described in more detail in co-pending patent application entitled "Video and Digital Multimedia Aggregator," filed on Aug. 3, 2001, which is incorporated by reference.

Requests for programming available from a local source are routed directly to a local content request processor 451 within the content delivery server 450. The local content request processor 451 initiates delivery of content from local sources including, but not limited to, the aggregator local storage 254 and aggregator local streaming sources 262, and routes the content to the coder and file formatter 253. In an embodiment, the local streaming sources 262 can include any of the cable television channels available at the cable television system headend 210 housing the aggregator 201. If the programming content is not already in the user-requested format and coding scheme, the coder and content formatter 253 (see FIG. 4) performs content formatting and coding of the programming for delivery to the user. The content is then forwarded to a content delivery processor 453, which manages the delivery of the content through the communications server 250 and wide area distribution system 203 to the user terminal 202.

If the programming being delivered from a remote content server 204 will be stored to the aggregator local storage 254, the programming metadata is analyzed to determine if the content is in an acceptable format for local storage. The aggregator 201 may be configured to store content in one or more specific formats that will balance the highest quality of programming content to be delivered to the users versus available storage space. In an embodiment, one or more of the selected storage formats will make the most efficient use of the aggregator local storage 254 resources as well as support high-speed delivery to system users. If the content acquisition server 400 determines that the content does not meet the format requirements for local storage, the content stream and/or contents are routed to the decoder and content formatter 252 (see FIG. 4). The decoder and content formatter 252 decodes the incoming data and may extract digital and/or analog data representing the content and any metadata associated with the content. The decoder and content formatter 252 then refoiuiats the content into the required formats and coding schemes for local storage. The properly formatted programming content may then be stored to the aggregator local storage 254.

Returning to FIG. 5, the remote content download processor 402 analyzes the programming content's metadata and determines if the content is in the appropriate format and coding scheme for delivery to the user. The format and coding scheme for delivery may be different from that used for local storage in order to accommodate particular parameters of a user's download request. The user may request specific formats and coding schemes due to considerations including, but not limited to, the method of playback, the type of programming, whether the user intends to store the content, or the type and bandwidth of the connection the user terminal 202 has to the aggregator 201 or the remote content server 204. If the content does not meet the format criteria, the content stream and/or contents are routed to the decoder and content formatter 252 along with the required formatting and coding parameters. The decoder and content formatter 252 decodes the incoming data and may extract digital and/or analog data representing the content and its metadata. The decoder and content formatter 252 then reformats the content into the required formats and coding schemes for delivery to the user.

If the programming download request is to be fulfilled by the local aggregator 201, the local content request processor 451 of the content delivery server 450 (see FIG. 6) analyzes the programming content's metadata and determines if the content is in the appropriate format and coding scheme for delivery to the user. If the format and coding scheme is not correct, the local content request processor 451 retrieves the programming content from the aggregator local storage 254 or the appropriate local streaming sources 262 and routes the programming to the coder and content formatter 253 along with the required formatting and coding parameters. The coder and content formatter 253 then decodes the incoming data and may extract digital and/or analog data representing the content and its metadata. The coder and content formatter 253 then reformats the content into the required formats and coding schemes for delivery to the user. The correctly coded and formatted programming content file(s) and/or streams, whether directly from local sources or from the coder and content formatter 253, and routes this content to the content delivery server 450.

The coder and content formatter 253 may employ digital compression techniques to increase existing transmission capacity. A number of digital compression algorithms currently exist or may be developed in the future that can achieve the resultant increase in capacity and improved signal quality desired for the system 200. For television and video content, algorithms generally use one or more of three basic digital compression techniques: (1) within-frame (intraframe) compression, (2) frame-to-frame (interframe) compression, and (3) within carrier compression or a combination of two or more techniques. The coder and content formatter 253 of the content search, packaging, and delivery system 200 will be able to use any one or combination of two or more of these techniques in addition to being able to have its capabilities modularly expanded to include any emerging and future techniques that are determined to be desirable. In an embodiment, although a single digital compression standard may be used for the delivery system 200, different levels of compression and/or digital coding can be utilized when delivering programs to a user requesting a particular program. For example, if the program is sent out using an HDTV format, then less compression is used as opposed to sending out the program using a standard video format. The reason is that the HDTV format requires more digital data per portion of content. Since the HDTV format requires more digital data, the HDTV format will also require more bandwidth to transmit, possibly increasing the cost of delivery. Therefore, the quality of the video delivered may be a variable in the fees charged to users of the system 200.

The decoder and content formatter 252 and the coder and content formatter 253 may be similar or identical in functionality, software configuration, and/or hardware configuration. In an embodiment, the decoder and content formatter 252 and the coder and content formatter 253 may be embodied by a single subsystem represented by a codec and content formatter 270, which is shown in detail in FIG. 7. In an alternate embodiment, the decoder and content formatter 252 and the coder and content formatter 253 may each comprise one or more separate codec and content formatters 270. The codec and content formatter 270 includes a codec and content formatter processor 271 that may communicate with and control other components of the codec and content formatter 270. In particular, the formatter processor 271 communicates with one or more content routers 272, one or more formatting codecs 274, and one or more auxiliary services processors 276. The formatter processor 271 communicates with one or more content routers 272 in order to transmit routing connection parameters and paths for the transfer of content data between various source and target subsystems. The formatter processor 271 communicates with one or more formatting codecs 274 to identify and manage available codec processing resources, configure codec hardware and/or software parameters for decoding, formatting, and coding operations, and to transmit routing information and coding and formatting parameters necessary for the formatting codecs 274 to decode, format, and code content from various sources. The formatter processor 271 also communicates with one or more auxiliary services processors 276 to allocate resources and transmit parameters associated with requests for auxiliary services processing. Auxiliary services may include closed captioning, descriptive video services, advertising, interactive services, and other data services. The formatter processor 271 may also communicate with other components of the content search, packaging, and delivery system 200 including the content delivery server 450, the content acquisition server 400, the aggregator local storage 254, and the local streaming sources 262 (see FIG. 4). Communications with these other systems includes receiving coding and formatting requests, transmitting content routing data, and managing content flow between various content sources and one or more components of the codec and content formatter 270.

When the remote content download processor 402 within the content acquisition server 400 and/or the content delivery processor 453 within the content delivery server 450 determine that a particular content entity needs to be decoded, formatted, reformatted, and/or coded, the respective processors (402, 453) transmit a coding and formatting request to the codec and content formatter 270. Coding and formatting requests convey data to the codec and content formatter 270 characterizing the input source content and the desired output target content. Data conveyed about the source and target content may include parameters such as physical and/or logical addresses, coding and compression parameters, format descriptions, content sizes and/or lengths, description or location of auxiliary services combined with the source content, description or location of auxiliary services to be combined with the target content, and other metadata elements that may be required for coding, formatting, and routing. The codec and content formatter 270 may then use these parameters to identify available resources, establish content routing paths, configure formatting codecs 274, configure auxiliary services processors 276, and perform the required coding and formatting operations to fulfill the coding and formatting request. In an embodiment, a coding and formatting request may identify one or more target content coding and formatting schemes, as in the case where one type of formatting may be applied to the target content for storage and another type of formatting may be applied to the target content for delivery to system users, which may require the codec and content formatter 270 to configure and control one or more of the formatting codecs 274 and auxiliary services processors 276.

Figure 7:
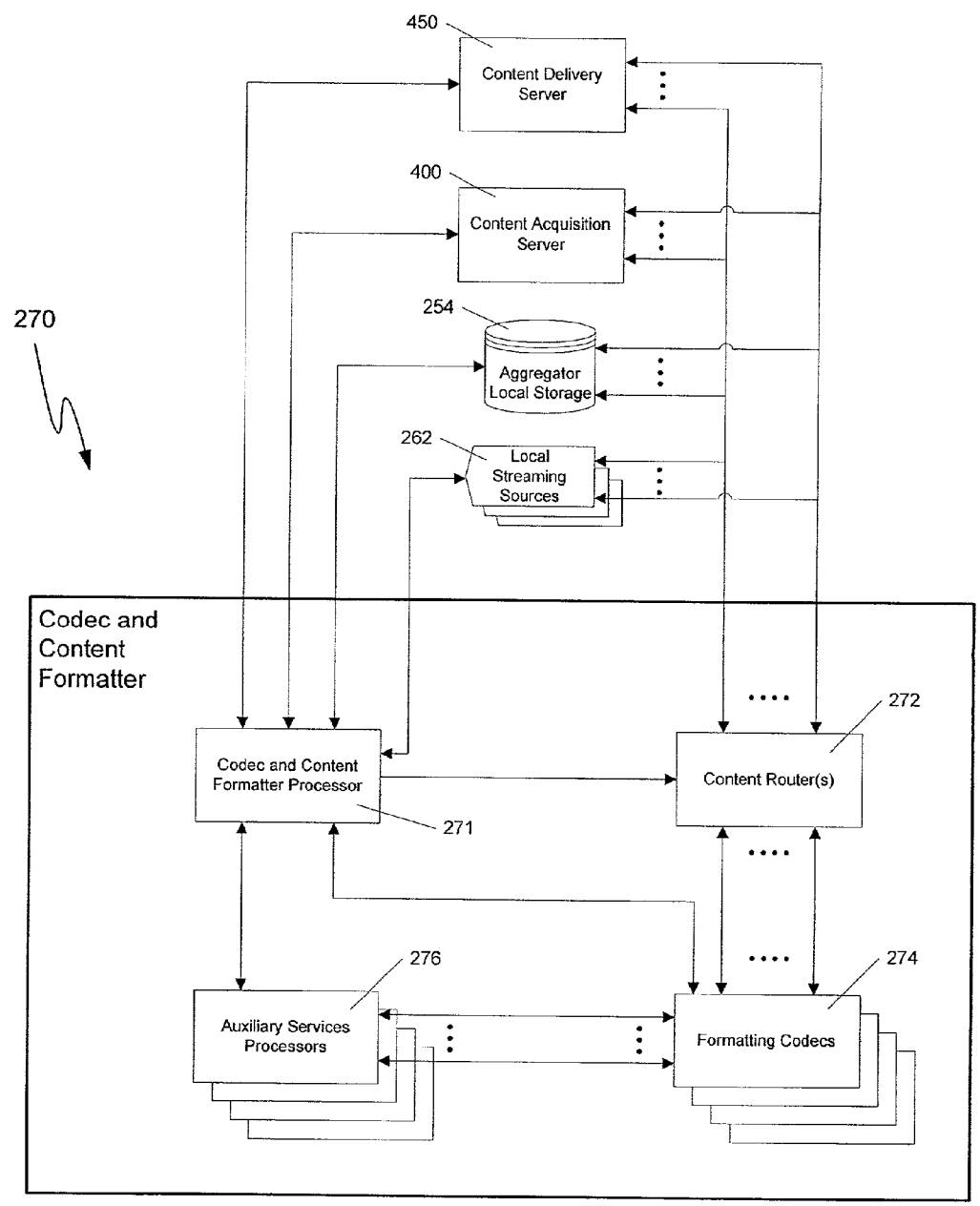
FIG. 7 is a schematic of subsystems of a codec and content formatter and components with which the codec and content formatter interacts as part of the content search, packaging, and delivery system.

The codec and content formatter 270 may use one or more of the content routers 272 to dynamically establish logical and/or physical circuit connections for transmission of content data between the various subsystems shown in FIG. 7. A content router 272 may comprise one or more hardware systems and one or more software modules that may operate under the direction of the formatter processor 271 to establish and manage the interconnections between subsystems required to transfer content in support of one or more coding and formatting operations. In FIG. 7, several of the interconnections between subsystems are shown as two connection lines and a series of dots between the two lines. This convention is used to indicate that at any time there may exist one or more connections or circuits between one or more of the connected subsystems and that between two connected subsystems the number of connections may vary. Each collection of connections or circuits may comprise one or more logical and/or one or more physical connections between software and/or hardware modules. Physical routing configurations, such as may be required for the transfer of analog content, may be achieved using one or more industry standard and/or custom components such as circuit switching devices, matrix switches, distribution amplifiers, signal splitters, input and output ports, and patch bays. Logical routing, such as may be required for the transfer of digital content, may be achieved using one or more digital packet transport protocols that may operate on one or more local area networks supported by the system administrator 500 as part of the content search, packaging, and delivery system 200. In an embodiment, the functionality of the content routers 272 may be implemented by one or more subsystems and may be functionally and/or physically external to the codec and content formatter 270 and may be a subsystem (not shown in FIG. 4) of the aggregator 201. In another embodiment, the functionality of the content routers 272 may be implemented by one or more subsystems and may be functionally and/or physically external to the aggregator 201 so that the aggregator 201 and its subsystems may connect to the content routers 272, or equivalent systems, through external interfaces (not shown in FIG. 4). The number of connections and the logical and physical routing paths of such connections both within the codec and file formatter 270 and external to the codec and file formatter 270 may be changed as required to accommodate a smaller or larger number of content pathways and to accommodate various source and destination combinations required at any given time. These pathways may be created or modified on a demand basis by the formatter processor 271 and may be modified prior to a coding and formatting operation and/or during a coding and formatting operation as may be required.

Content that is stored locally by the system 200 and/or acquired remotely may exist in one or more of numerous standardized and/or proprietary formats with various coding and compression schemes applied and may need to be decoded, reformatted, and/or recoded to satisfy local storage requirements and requirements of delivery to one or more system users. The content decoding, formatting, and/or coding functions may be performed by one or more of the formatting codecs 274 as shown in FIG. 7. Decoding of a content file or stream may comprise several processing operations that may include performing a packet or frame alignment, reading and caching content metadata, reading embedded time code information, reading and caching auxiliary services data, and recovering and caching content payload data in digital form and/or analog baseband form. Formatting or reformatting of content payload data may comprise several processing operations that may include analog-to-digital conversion, digital-to-analog conversion, packetizing or framing digital data representing content into one or more standard and/or proprietary formats, translating digital data representing content from one or more standard and/or proprietary formats into one or more other standard and/or proprietary formats, modifications to existing auxiliary services that may be packaged with the content, addition of auxiliary services such as closed captioning and/or advertising, frame rate translation of video content, video aspect ratio format conversion (e.g., 4×3 television or 16×9 movies), and any required audio and/or video processing. Coding of a content file or stream may comprise several processing operations that may include applying varying levels of compression and various schemes of error correction coding to one or more content files and/or signals.

The codec and content formatter 270 may contain one or more banks of one or more formatting codecs 274 that may comprise one or more separate software and/or hardware modules. The hardware and/or software modules may exist as a flexible group of resources that may be accessed on a demand basis and may be dynamically assigned and configured to accommodate virtually any content decoding, formatting, and coding operation. When the formatter processor 271 receives a coding and formatting task request from the content acquisition server 400 or the content delivery server 450, the formatter processor 271 may poll the group of formatting codec 274 resources, identify available resources required for the requested task, configure those resources to perform the requested task thereby configuring a formatting codec 274, and transmit the required decoding, formatting, and coding parameters as well as routing information to the newly configured formatting codec 274. In an embodiment, the formatter processor 271 may configure and activate one or more available hardware and/or software modules by downloading appropriate software modules to perform particular decoding, formatting, and coding tasks as required by a user content download request or other content acquisition task. The ability of the formatting codecs 274 to be software configurable may allow a high degree of configuration flexibility as well as the ability to accommodate coding and formatting schemes yet to be developed.

Figure 8:
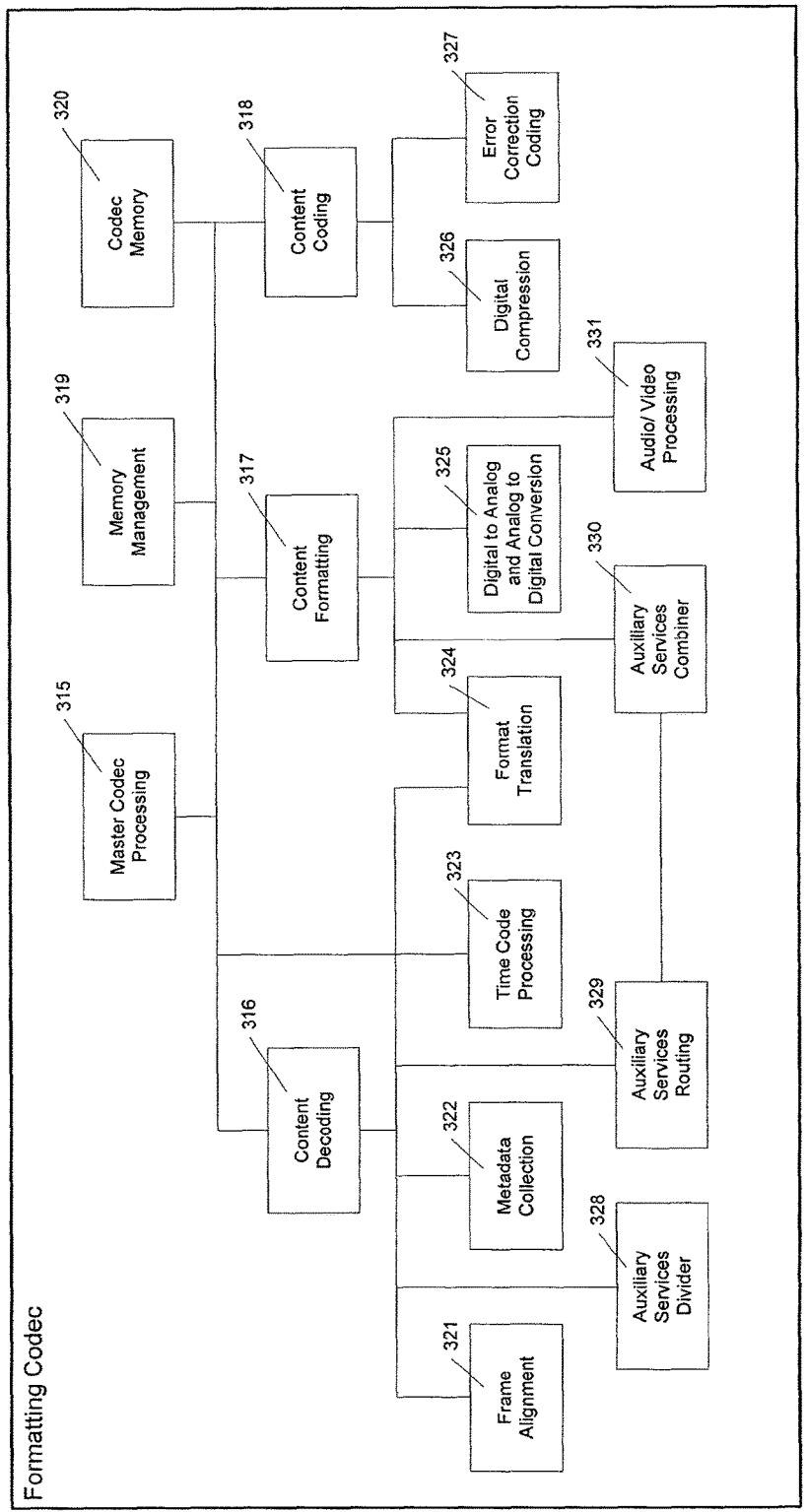
FIG. 8 is a diagram of components of a formatting codec used with the codec and content formatter of FIG. 7.

An example of a formatting codec 274 configuration is shown in detail in FIG. 8. The formatting codec 274 includes a master codec processing module 315 that is coupled to one or more other processing modules and that may manage the configuration and operation of one or more other processing modules within the formatting codec 274. In an embodiment, the processing modules within the formatting codec 274 may be interconnected using a bus topology that may allow dynamic interconnectivity between up to all of the processing modules and may support logical addressing of modules for communications routing. The master codec processing module 315 may be coupled to a memory management module 319 and a codec memory module 320. The memory management module 319 may dynamically assign and manage resources within the codec memory 320 for use by one or more other processing modules within the formatting codec 274.

The master codec processing module 315 is coupled to a content decoding module 316 that may manage the configuration and operation of one or more processing modules in order to perform content decoding operations. Coupled to the content decoding module 316 is a frame alignment module 321 that may use decoding parameters received from the formatter processor 271 to synchronize and align the formatting codec 274 with the incoming content data packets and/or frames. Also coupled to the content decoding module 316 is a metadata collection module 322 that may read any metadata information contained in one or more content files and content transport streams and may temporarily store this data in the codec memory 320. A time code processing module 323 is also coupled to the content decoding module 316 and may extract any time code data that may be embedded in one or more content files and/or content transport streams and may store and/or process the time code as required to support coding and formatting operations. The content decoding module 316 is further coupled to a format translation module 324, which may perform the actual translation of the incoming source content data to the desired output target content format. An example of format translation may involve reading a source video file in a proprietary digital format and translating the content data into a standardized format. The content decoding module 316 is also coupled to an auxiliary services divider module 328 and an auxiliary services routing module 329. The auxiliary services divider module 328 may read any auxiliary services that may be a part of the source content files and/or transport stream and may separate, or parse, these data services from the content data and metadata. The auxiliary services routing module 329 may then route the auxiliary services data to one or more of the codec memory 320 and/or auxiliary services processors 276.

The master codec processing module 315 is coupled to a content formatting module 317 that may perform content formatting operations and/or manage the configuration and operation of one or more processing modules in order to perform content formatting operations. Coupled to the content formatting module 317 is a format translation module 324 that may perform translation of incoming source content data into desired output target content format. Processing steps to accomplish content formatting and format translation may be optimized to minimize degradation of the content data and/or signal. The content formatting module 317 is also coupled to a digital-to-analog and analog-to-digital conversion module 325 that may perform any required conversion of audio and video content between analog and digital formats to support source content that may exist in various digital and/or analog formats and may be delivered to system users in various digital and/or analog formats. The content formatting module 317 is also coupled to an auxiliary services combiner module 330, which may combine and/or recombine any previously existing and/or newly established auxiliary services with the target content files and/or transport stream. The auxiliary services combiner 330 is in turn coupled to the auxiliary services routing module 329 in order to receive appropriate auxiliary services data. The content formatting module 317 is further coupled to an audio/video processing module 331 that may perform various processing functions on the audio and video signals of the source content to meet target content requirements. The audio/video processing functions may include adjusting audio levels, combining and/or splitting audio signals, and adjusting video luminance and chrominance.

The master codec processing module 315 may also be coupled to a content coding module 318 that may perform content coding operations and/or manage the configuration and operation of one or more processing modules in order to perform content coding operations. Coupled to the content coding module 318 is a digital compression module 326 that, as required, may apply various digital compression schemes to the target content that was not previously digitally compressed during content formatting and or translation. Different levels of digital compression may be applied to one or more target content files and/or transport streams. The different compression levels may be based on requirements such as those regarding content delivery quality and available content delivery bandwidth and/or storage capacities. An error correction coding module 327 is also coupled to the content coding module 318 and may apply one or more of various digital forward error correction coding schemes to one or more of the target content files and/or transport streams to reduce digital errors during content delivery and allow correction of data containing a certain level of errors.

The codec and content formatter 270 may contain one or more banks of auxiliary services processors 276. The auxiliary services processors may comprise one or more separate software and/or hardware modules. The auxiliary services processors 276 may process and/or generate auxiliary services to be included with target content. Such auxiliary services may include closed captioning services, descriptive video services, advertising, interactive services, and other data services. The hardware and/or software modules may exist as a flexible group of resources that may be accessed on a demand basis and that may be dynamically assigned and configured to accommodate various auxiliary services processing operations. When the codec and content formatter processor 271 receives a coding and formatting request that includes auxiliary services processing requests from the content acquisition server 400 or the content delivery server 450, the formatter processor 271 may analyze the auxiliary processing parameters contained in the coding and formatting request. The analyzed parameters are then used to determine the required configuration of one or more auxiliary services processors 276 necessary to perform the requested operations. The formatter processor 271 may then poll the group of auxiliary services processing resources, identify the available resources required for the requested task, configure those resources to perform the requested task, and transmit the required auxiliary services parameters as well as routing information to the auxiliary services processor 276. In an embodiment, the formatter processor 271 may configure and activate one or more available hardware and/or software modules by downloading appropriate software modules to perform particular auxiliary services processing tasks as required by a user content download request or other content acquisition task. The ability of the formatting codecs 274 to be software configurable allows a high degree of configuration flexibility as well as the ability to accommodate auxiliary services yet to be developed.

Auxiliary services may accompany both analog and digital content deliveries and may be embedded in one or more content files and/or transport streams. Auxiliary services accompanying video programming content may include closed captioning services for users with hearing impairments, descriptive video services for system users with visual impairments, alternative language audio service, v-chip program rating information, critical review information, device control parameters and commands, future programming schedules, advertising, advertising insert tags, other text and data services, and interactive services data such as browser pages, menus, icons, and links. Auxiliary services accompanying audio programming content may include extended metadata such as graphics files, in-depth data about the producers of the content, critical reviews, future programming schedules, device control parameters and commands, advertising, advertising insert tags, other text and data services, and interactive services data such as browser pages, menus, icons, and links. Auxiliary services processed by the formatter 270 may be pre-existing services recovered from source content and routed from one or more formatting codecs 274 to one or more auxiliary services processors 276 and/or newly established services transferred from one or more other content search, packaging, and delivery system 200 resources through the codec and content formatter processor 271 to one or more auxiliary services processors 276. In an embodiment, one or more auxiliary services processors 276 may comprise an audio closed captioning processor that may receive audio and time code data for a particular video content entity from a formatting codec 274, perform speech-recognition and other processing on the audio data, and output one or more files and/or transport streams that contain time-code-synchronized closed captioning text and data to be combined with the target content as an auxiliary service.

Figure 9:
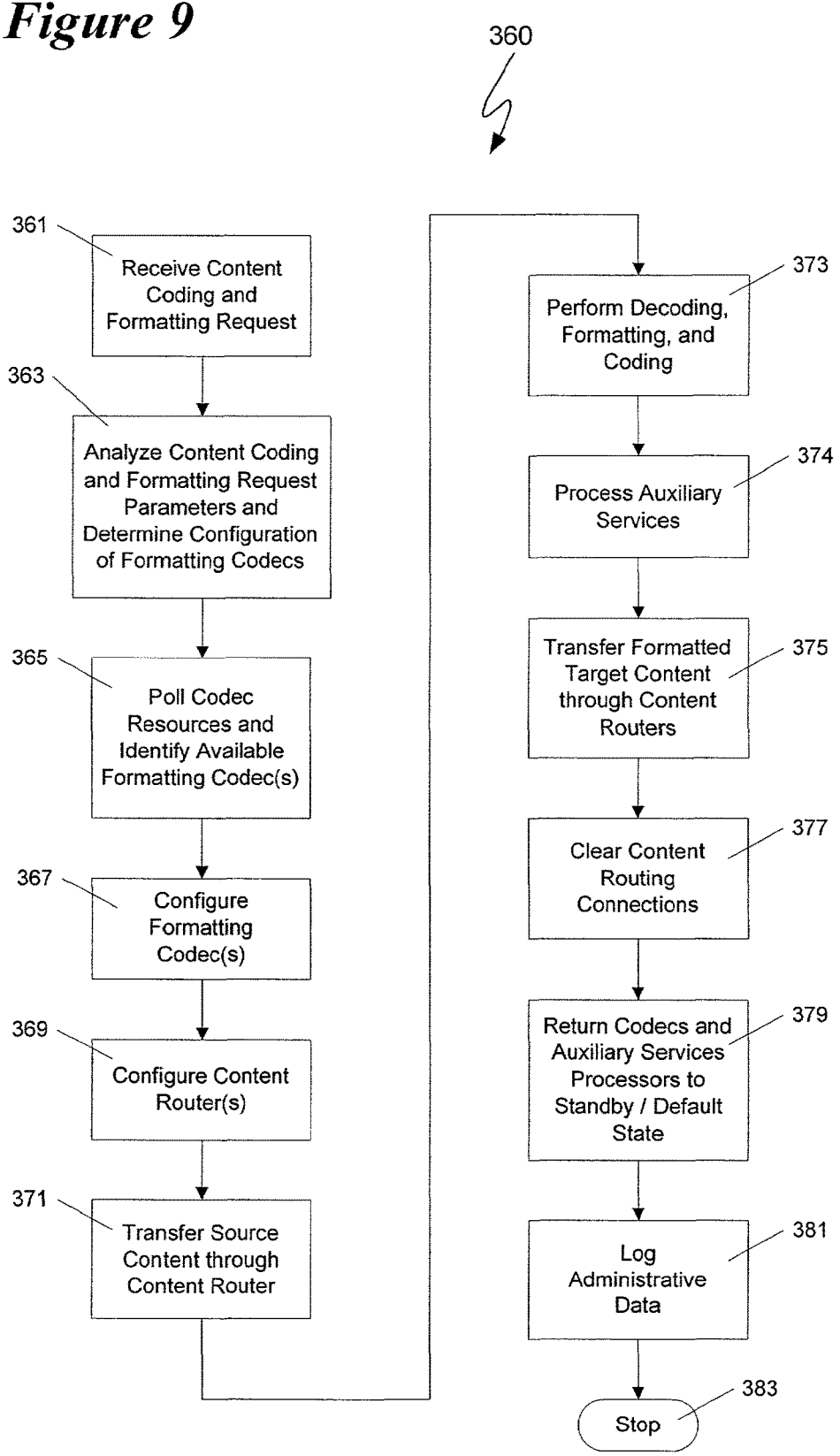
FIG. 9 shows a flowchart describing a process of decoding, formatting, and coding source content and outputting target content.

FIG. 9 shows an overview of the content formatting and coding process 360 performed by the codec and content formatter 270. The codec and content formatter processor 271 (see FIG. 8) first receives a coding and formatting request from the content acquisition server 400 and/or the content delivery server 450, routine 361. The formatter processor 271 then uses routine 363 to analyze the coding and formatting request parameters contained in the coding and formatting request in order to determine the required configuration of one or more formatting codecs 274 necessary to perform the requested operations. The formatter processor 271 may then poll formatting and coding resources, routine 365, and identify available formatting codec hardware and/or software modules necessary to realize the required configuration. Routine 367 may then configure one or more formatting codecs 274 using the coding and formatting request parameters and required configuration data to access and configure one or more formatting codec 274 hardware and/or software modules. The formatter processor 271 may then use source content and target content routing address information from a decoding and formatting request to configure one or more content routers 272, routine 369. Routine 371 may then initiate and manage the transfer of source content through one or more content routers 272 from one or more source locations to one or more formatting codecs 274. Source locations may include the content acquisition server 400, the content delivery server 450, aggregator local storage 254, and local streaming sources 262. One or more formatting codecs 274 may then execute routine 373, which may make use of the hardware and/or software modules shown in detail in FIG. 8 to perform the requested decoding, formatting, and coding operations to produce the target output content. Routine 374 may then perform processing of auxiliary services as outlined in the content coding and formatting request. Auxiliary services processing starts at the formatting codec 274, which parses existing auxiliary services from the source content and routes those services to one or more auxiliary services processors 276, which perform appropriate processing on existing auxiliary services as well as establish new auxiliary services as required. The auxiliary services processors 276 may then route the appropriate auxiliary services to one or more formatting codecs 274 for combination with one or more target output content files and/or data transport streams.

Once the one or more target content files and/or transports streams have been assembled, routine 375 within the formatter processor 271 transfers the formatted target content through one or more content routers 272 to one or more target addresses residing in one or more components external to the codec and content formatter 270 which may include the content acquisition server 400, the content delivery server 450, aggregator local storage 254, and/or local streaming sources 262. The formatter processor 271 may then clear content routing connections using routine 377. Content routing connections to be cleared may include one or more physical routing connections and/or one or more logical routing connections. Physical routing connections may be cleared by returning routing circuitry to an idle or standby state and logical routing connections may be cleared by removing logical address information from appropriate memory registers within one or more content routers 272. The formatter processor 271 may then return one or more configured formatting codecs 274 and/or auxiliary services processors 276 to a standby and/or default state, routine 379, and return the one or more formatting codec 274 and or auxiliary services processor 276 hardware and/or software modules to the available pools of formatting resources and/or auxiliary services processing resources, respectively. Routine 381 within the formatter processor 271 may then log appropriate administrative data with the content acquisition server 400 and/or the content delivery server 450. Routine 383 may then stop processing.

Figure 10:
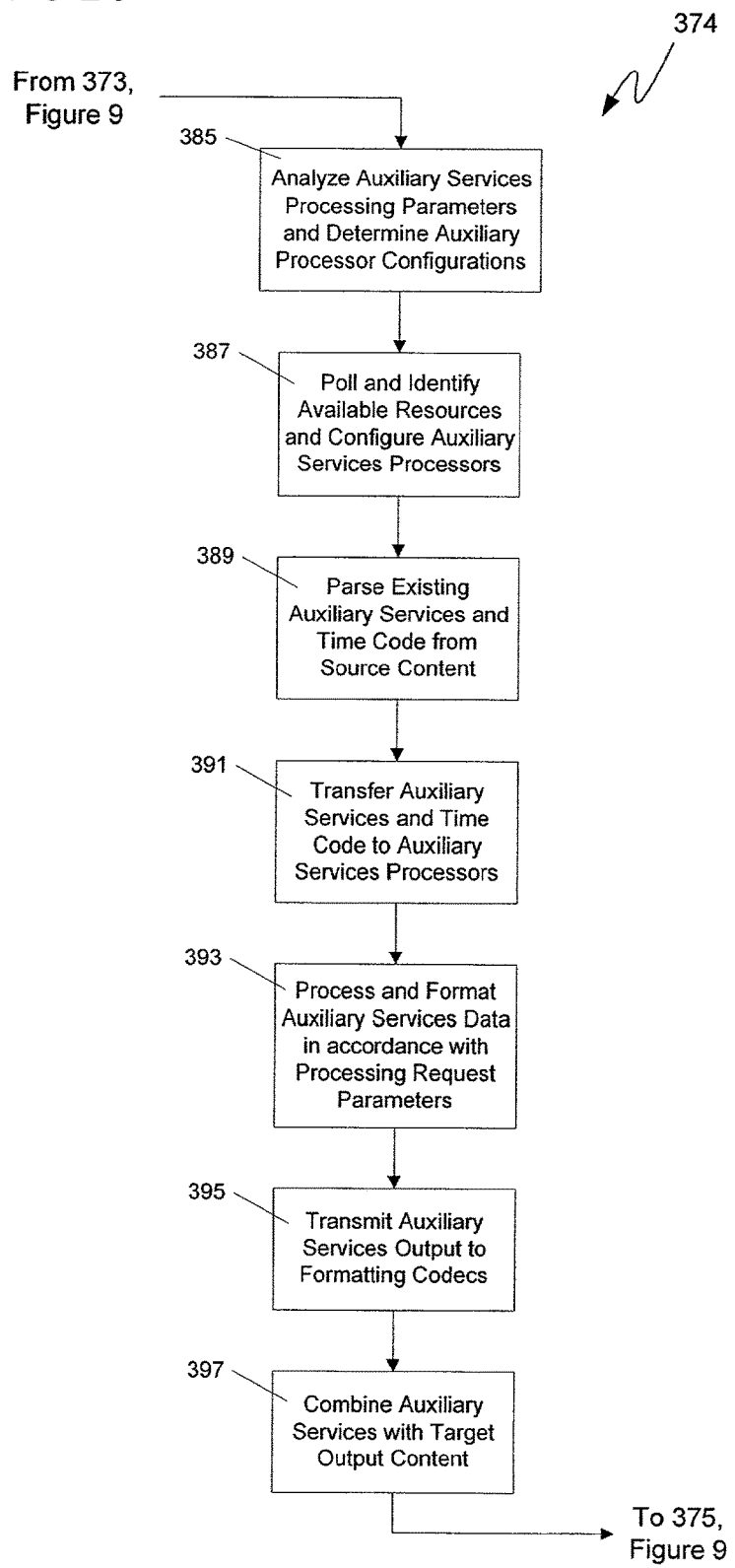
FIG. 10 shows a flowchart describing a method of processing auxiliary services that may accompany source and/or target content.

FIG. 10 shows the auxiliary services processing of routine 374 in more detail. If existing auxiliary services and/or newly established auxiliary services are to be combined with target output content, then routine 385 within one or more of the formatter processor 271 and/or formatting codecs 274 analyzes any auxiliary services processing request parameters that may be part of the coding and formatting request and determines the necessary configuration of one or more auxiliary services processors 276. Routine 387 within the formatter processor 271 may then poll available auxiliary processing resources and configure one or more auxiliary services processors 276 required to perform the requested processing operations. One or more formatting codecs 274 may parse, or separate, existing auxiliary services and time code data that may be combined with one or more source content files and/or transport streams, routine 389. Routine 391 may then transfer these auxiliary services as well as the source content time code data to one or more auxiliary services processors 276. Routine 391 may also transfer data from sources external to the codec and content formatter 270 that may be required to establish new auxiliary services to be combined with the target output content. These external sources may include the content acquisition server 400, the content delivery server 450, and the aggregator local storage 254. One or more auxiliary services processors 276 may then perform one or more processing and formatting operations on one or more sources of auxiliary services data in accordance with processing request parameters in order to output one or more target auxiliary services to be combined with target output content, routine 393. Routine 395, which may reside within the formatter processor 271 and/or one or more auxiliary services processors 276, may then transmit these output auxiliary services to one or more formatting codecs 274. Routine 397 may then be executed by one or more formatting codecs 274 to combine the auxiliary services with one or more target output content files and/or data streams. Processing is then continued with routine 375 as shown in FIG. 9 and as described above.

What is claimed is:

1. A method comprising:
receiving, from a first source and based on a first content search request, first auxiliary service data;
receiving, from a second source and based on a second content search request for first content in a first format, the first content combined with second auxiliary service data, wherein the first content combined with the second auxiliary service data is in a second format;
after separating the first content from the second auxiliary service data, formatting the first content into the first format;
combining the first content in the first format with the first auxiliary service data; and
outputting the first content in the first format combined with the first auxiliary service data.

2. The method of claim 1, further comprising:
generating a single file comprising the first content in the first format combined with the first auxiliary service data.

3. The method of claim 1, further comprising:
synchronizing, based on time code data associated with the first content, the first auxiliary service data with the first content in the first format.

4. The method of claim 1, wherein the first content in the first format is formatted based on a first set of compression parameters, and the first content in the second format is formatted based on a second set of compression parameters.

5. The method of claim 1, wherein the first auxiliary service data comprises one or more of closed captioning, descriptive video narration, alternative language audio, content rating, critical review information, device control, a future content schedule, untargeted advertising, targeted advertising, a text service, a data service, an interactive service, or content metadata.

6. The method of claim 1, wherein the second auxiliary service data comprises data for a plurality of auxiliary services.

7. The method of claim 1, wherein the second content search request for the first content in the first format is received from a user device.

8. The method of claim 1, further comprising:
polling a plurality of resources to format the first content into the first format;
determining, based on the polling, one or more available resources from the plurality of resources; and
wherein formatting the first content into the first format is based on at least one of the one or more available resources.

9. The method of claim 1, further comprising:
combining the first content in the first format and the first auxiliary service data into a single transport stream.

10. A method comprising:
receiving, from a first source and based on a first content search request, first auxiliary service data;
receiving, from a second source that is different than the first source and based on a second content search request, first content comprising second auxiliary service data;
after separating the second auxiliary service data from the first content, generating formatted content comprising the first content and the first auxiliary service data; and
outputting the formatted content.

11. The method of claim 10, further comprising:
generating a single file comprising the first content and the first auxiliary service data.

12. The method of claim 10, wherein the first auxiliary service data comprises a plurality of auxiliary services.

13. The method of claim 10, wherein the second auxiliary service data comprises one or more of closed captioning, descriptive video narration, alternative language audio, content rating, critical review information, device control, a future content schedule, untargeted advertising, targeted advertising, a text service, a data service, an interactive service, or content metadata.

14. The method of claim 10, further comprising:
polling a plurality of resources to format the first auxiliary service data from a first format into a second format;
determining, based on the polling, one or more available resources from the plurality of resources; and
formatting, based on at least one of the one or more available resources, the first auxiliary service data from the first format into the second format.

15. The method of claim 14, wherein the second format is determined by a set of parameters in the second content search request from a user device and for the first content.

16. The method of claim 10, wherein outputting the formatted content comprises:
sending the formatted content via a single transport stream.

17. The method of claim 10, further comprising:
synchronizing the first auxiliary service data with the first content using time code data in the first content.

18. A system comprising:
a user device; and
an apparatus comprising:
one or more processors; and
memory storing instructions that, when executed by the one or more processors, cause the apparatus to:
receive, based on a first content search request, first auxiliary service data;
receive, based on a second content search request for first content in a first format, the first content combined with second auxiliary service data;
generate, after separating the first content from the second auxiliary service data, formatted content comprising the first content and the first auxiliary service data; and
output, to the user device and based on the second content search request, the formatted content.

19. The system of claim 18, wherein the user device comprises one or more of a set-top box or a computer.

20. The system of claim 18, further comprising:
a second apparatus comprising one or more second processors and second memory storing executable instructions that, when executed by the one or more second processors, cause the second apparatus to provide, to the apparatus, the first content in a second format.

* * * * *

UNITED STATES PATENT AND TRADEMARK OFFICE
CERTIFICATE OF CORRECTION

PATENT NO. : 10,349,096 B2
APPLICATION NO. : 14/065850
DATED : July 9, 2019
INVENTOR(S) : Swart et al.

It is certified that error appears in the above-identified patent and that said Letters Patent is hereby corrected as shown below:

Page 11, Column 2, Other Publications, Line 24:
Please delete "14/093,087," and insert --14/093,807,--

Page 12, Column 2, Other Publications, Line 1:
Delete "MPEG-4-0pening" and insert --MPEG-4-Opening--

Page 12, Column 2, Other Publications, Line 16:
Delete "Alan 0." and insert --Alan O.--

Page 12, Column 2, Other Publications, Line 20:
Delete "Am Barish" and insert --Ambarish--

Column 6, Detailed Description, Line 57:
Delete "central" and insert --content--

Column 9, Detailed Description, Line 61:
Delete "refoiuiats" and insert --reformats--

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*